United States Patent
Kang et al.

(10) Patent No.: US 12,001,954 B2
(45) Date of Patent: Jun. 4, 2024

(54) METHOD OF PERFORMING LEARNING OF DEEP NEURAL NETWORK AND APPARATUS THEREOF

(71) Applicant: SAMSUNG ELECTRONICS CO., LTD., Suwon-si (KR)

(72) Inventors: Sungho Kang, Suwon-si (KR); Hyungdal Kwon, Suwon-si (KR); Cheon Lee, Suwon-si (KR); Yunjae Lim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1050 days.

(21) Appl. No.: 16/281,737

(22) Filed: Feb. 21, 2019

(65) Prior Publication Data

US 2019/0258932 A1 Aug. 22, 2019

(30) Foreign Application Priority Data

Feb. 20, 2018 (KR) ........................ 10-2018-0020005

(51) Int. Cl.
*G06N 3/08* (2023.01)
*G06F 7/58* (2006.01)
*G06N 3/04* (2023.01)
*G06N 3/082* (2023.01)

(52) U.S. Cl.
CPC ............... *G06N 3/082* (2013.01); *G06F 7/58* (2013.01); *G06N 3/04* (2013.01)

(58) Field of Classification Search
CPC .......... G06F 7/58; G06N 3/04; G06N 3/0445; G06N 3/0454; G06N 3/082
See application file for complete search history.

(56) References Cited

U.S. PATENT DOCUMENTS

| 9,417,845 B2 | 8/2016 | Lamb |
| 2016/0307098 A1 | 10/2016 | Goel et al. |
| 2017/0024642 A1 | 1/2017 | Xiong et al. |
| 2017/0140262 A1 | 5/2017 | Wilson et al. |
| 2017/0147921 A1 | 5/2017 | Kasahara |
| 2017/0270593 A1 | 9/2017 | Sherman et al. |
| 2017/0323197 A1* | 11/2017 | Gibson ................ G06N 3/0454 |

(Continued)

FOREIGN PATENT DOCUMENTS

| CN | 105612492 A | 5/2016 |
| CN | 106127301 A | 11/2016 |

OTHER PUBLICATIONS

Yeoh et al. ("A Hardware-Oriented Dropout Algorithm for Efficient FPGA Implementation", ICONIP 2017, Part VI, LNCS 10639, 2017, pp. 821-829) (Year: 2017).*

(Continued)

*Primary Examiner* — Miranda M Huang
*Assistant Examiner* — Robert Lewis Kulp
(74) *Attorney, Agent, or Firm* — Sughrue Mion, PLLC

(57) ABSTRACT

An encoding apparatus connected to a learning circuit processing learning of a deep neural network and configured to perform encoding for reconfiguring connection or disconnection of a plurality of edges in a layer of the deep neural network using an edge sequence generated based on a random number sequence and dropout information indicating a ratio between connected edges and disconnected edges of a plurality of edges included in a layer of the deep neural network.

20 Claims, 17 Drawing Sheets

(56) References Cited

U.S. PATENT DOCUMENTS

| | | | |
|---|---|---|---|
| 2017/0344829 A1 | 11/2017 | Lan et al. | |
| 2018/0046597 A1* | 2/2018 | Chen et al. | |
| 2018/0232640 A1* | 8/2018 | Ji | G06N 3/082 |
| 2018/0322607 A1* | 11/2018 | Mellempudi | G06F 5/01 |
| 2019/0121639 A1* | 4/2019 | Felix | G06F 9/30036 |

OTHER PUBLICATIONS

Wan et al. ("Regularization of Neural Networks using DropConnect", Proceedings of the 30th International Conference on Machine Learning, 2013, pp. 1-9) (Year: 2013).*

Duyck et al. ("Modified dropout for training neural network," School Comput. Sci., Carnegie-Mellon Univ., Pittsburgh, PA, USA, Advanced Introduction to Machine Learning Course, Tech. Rep. 10-715, Fall 2014, pp. 1-9) (Year: 2014).*

Vandal et al. ("Uncertainty Quantification for Statistical Downscaling using Bayesian Deep Leraning", 7th International Workshop on Climate Informatics, 2017, pp. 29-32) (Year: 2017).*

International Search Report (PCT/ISA/210) and Written Opinion (PCT/ISA/237) dated May 22, 2019 issued by the International Searching Authority in International Application No. PCT/KR2019/002051.

Communication issued by the European Patent Office dated Feb. 15, 2023 in European Patent Application No. 19757993.1.

Communication issued Oct. 26, 2023 by the Korean Intellectual Property Office in Korean Patent Application No. 10-2018-0020005.

Communication issued Apr. 18, 2024 by the Chinese National Intellectual Property Adminstration in Chinese Patent Application No. 201980014452.6.

* cited by examiner

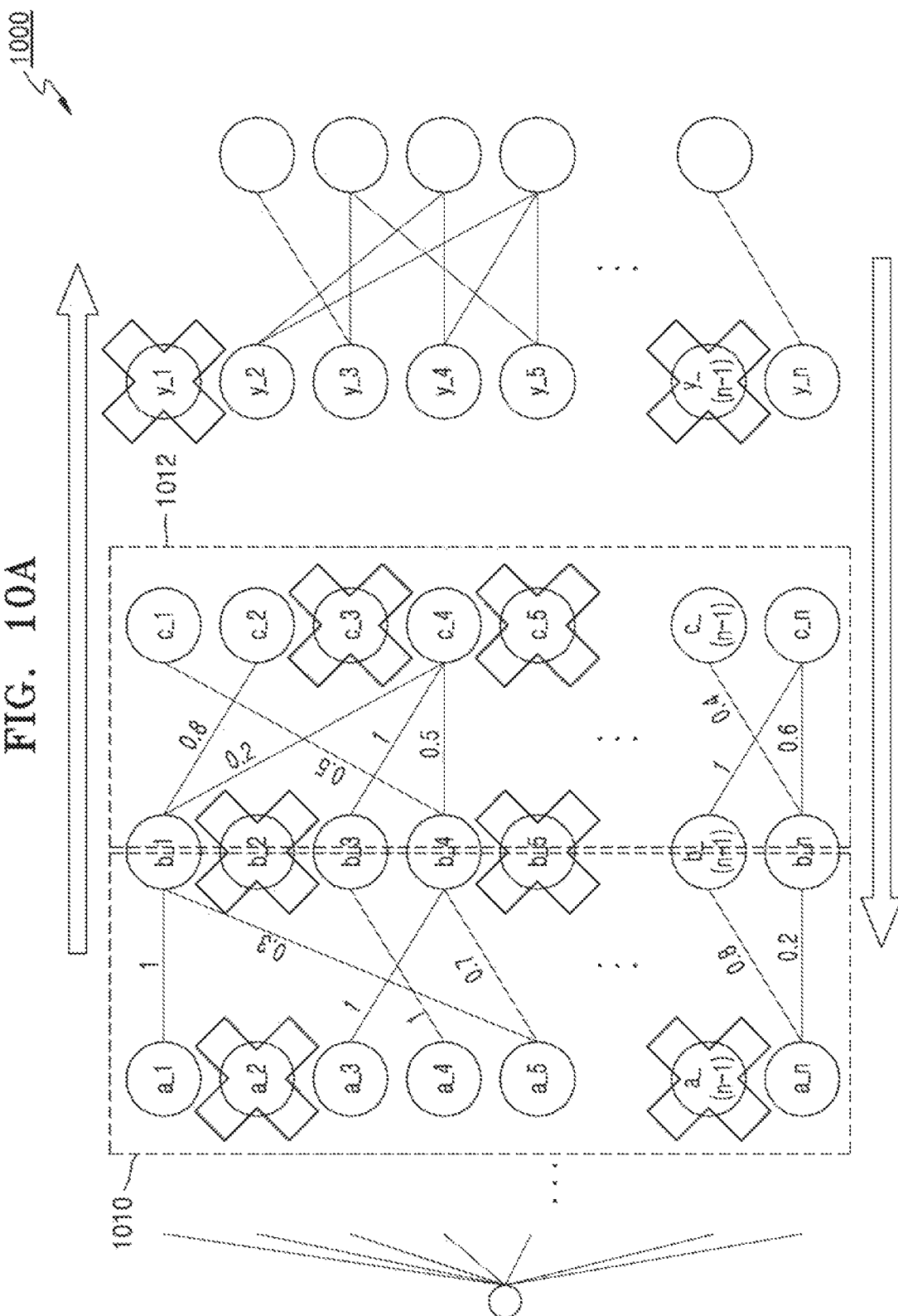

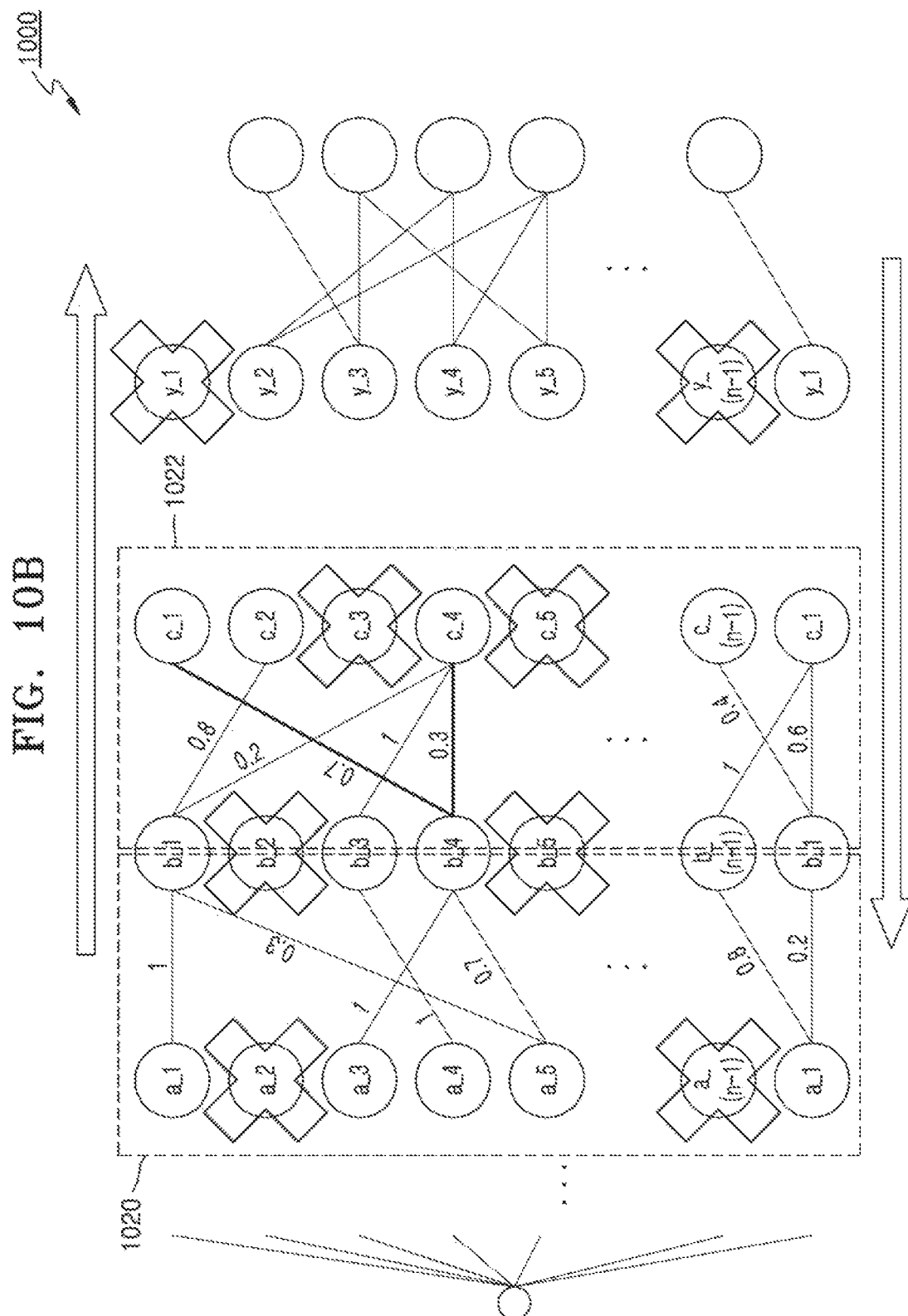

METHOD OF PERFORMING LEARNING OF DEEP NEURAL NETWORK AND APPARATUS THEREOF

CROSS-REFERENCE TO RELATED APPLICATION(S)

This application is based on and claims priority under 35 U.S.C. § 119 to Korean Patent Application No. 10-2018-0020005, filed on Feb. 20, 2018, in the Korean Intellectual Property Office, the disclosure of which is incorporated by reference herein in its entirety.

BACKGROUND

1. Field

The disclosure relates to methods and apparatuses for performing deep neural network learning for drawing inferences using a deep neural network.

2. Description of Related Art

An artificial intelligence (AI) system is a computer system that realizes or attempts to mimic human-level intelligence. Unlike existing rule-based smart systems, an AI system learns and makes decisions. The more an AI system is used, the higher the recognition rate of the AI system, for example understanding user preference more accurately. Thus, existing rule-based smart systems have been gradually replaced by deep learning-based AI systems.

AI technology consists of machine learning (deep learning) and element technologies that utilize the machine learning.

Machine learning is an algorithmic technology that classifies or learns the features of input data. Element technology is a technology that uses machine learning algorithms such as deep learning, and consists of technical fields such as linguistic understanding, visual comprehension, inference/prediction, knowledge representation, and motion control.

The various fields to which AI technology is applied are as follows: linguistic understanding, which is a technology for recognizing and applying/processing human language/characters and includes natural language processing, machine translation, dialogue systems, query response, speech recognition/synthesis, and the like; visual comprehension, which is a technology for recognizing and processing objects like human vision and includes object recognition, object tracking, image search, human recognition, scene understanding, spatial understanding, image enhancement, and the like; inference prediction, which is a technology for judging, logically inferring, and predicting information and includes knowledge/probability-based inference, optimization prediction, preference-based planning, recommendation, and the like; knowledge representation, which is a technology for automating human experience information into knowledge data and includes knowledge building (data generation/classification), knowledge management (data utilization), etc.; and motion control, which is a technology for controlling autonomous driving of a vehicle and motion of a robot, and includes motion control (navigation, collision, and driving), operation control (behavior control), or the like.

SUMMARY

An inference process using a deep neural network may be used to accurately classify or assort input information. For higher accuracy of interference of a deep neural network, a relatively large number of operation processes may be required, and accordingly, the number of layers or depths forming a deep neural network is increased. As the quantity of layers forming a deep neural network increases, the quantity of operations needed for obtaining an inference via a deep neural network increases. Thus, various methods have been used to reduce the amount of operations while increasing inference accuracy of a deep neural network. For example, a method of performing learning by omitting some edges, nodes, or the like that constitute a layer forming a deep neural network to reduce the amount of operations occurring in a process of performing learning to increase inference accuracy of a deep neural network is used.

However, in the methods to reduce the amount of operations, the process of arbitrarily removing some edges or nodes constituting a layer is to be implemented by software, thus requiring another operation and making optimization of a deep neural network difficult. In detail, the above-described software implementation may be performed via an operating system. In detail, execution of an operation such as memory allocation or executing a system call for random number generation for generating a signal for removing some edges or nodes is required. Accordingly, when software implementation is used to reduce the amount of operations associated with obtaining an interference using artificial intelligence, latency increases due to the execution of complicated operations and calculation operation performed, and the operation amount also increases.

Thus, a method and apparatus to address the increase in the amount of operations and the increase in a latency occurring in the software implementation described above may be desirable.

Additional aspects will be set forth in part in the description which follows and, in part, will be apparent from the description, or may be learned by practice of the presented embodiments of the disclosure.

According to an embodiment of the disclosure, there is provided an encoding apparatus including: a memory storing a random number sequence generated by a random number generator; and an encoder configured to receive dropout information of a deep neural network, the dropout information indicating a ratio between connected edges and disconnected edges of a plurality of edges included in a layer of the deep neural network, generate an edge sequence indicating connection or disconnection of the plurality of edges based on the dropout information and the random number sequence, and output the edge sequence for reconfiguring the connection or disconnection of the plurality of edges.

The random number sequence may be based on a clock signal of the random number generator.

A size of the random number sequence may be determined based on a number of edges in the layer of the deep neural network.

The dropout information, the random number sequence, and the edge sequence may each have a bit width formed of binary numbers.

The encoder may generate the edge sequence based on a first ratio of bits in the random number sequence having a bit value of 0 to bits in the random number sequence having a bit value of 1, and a second ratio of bits in the dropout information having a bit value indicating a connected edge to bits in the dropout information having a bit value indicating a disconnected edge.

The encoder may generate the edge sequence based on a pattern of bits in the random number sequence having a bit value of 0 and bits in the random number sequence having a bit value of 1 a pattern of bits in the dropout information having a bit value indicating a connected edge and bits in the dropout information having a bit value indicating a disconnected edge.

The size of the random number sequence may be equal to the number of edges of the layer of the deep neural network.

The edge sequence may be a basis for a dropout operation in the layer of the deep neural network.

The encoding circuit may obtain weights of the plurality of edges of the layer of the deep neural network, perform a pruning operation based on a result of comparing the weights with a preset threshold weight, and generate the edge sequence to generate connection or disconnection of the plurality of edges of the layer of the deep neural network based on the pruning operation.

The encoding apparatus may further include a selector configured to select one of a plurality of types of input signals and outputting the selected signal, wherein the encoder receives an operation result from the deep neural network to determine whether overflow has occurred in the operation result and performs a dynamic fixed point operation of modifying an expressible range of information used in the deep neural network based on whether overflow has occurred.

According to an embodiment of the disclosure, there is provided an encoding method performed by an encoding apparatus, the encoding method including: storing a random number sequence generated by a random number generator; receiving dropout information of a deep neural network, the dropout information indicating a ratio between connected edges and disconnected edges of a plurality of edges included in a layer of the deep neural network; generating an edge sequence indicating connection or disconnection of the plurality of edges based on the dropout information and the random number sequence; and outputting the edge sequence for reconfiguring the connection or disconnection of the plurality of edges.

The random number sequence may be based on a clock signal of the random number generator.

A size of the random number sequence may be determined based on a number of the plurality of edges in the layer of the deep neural network.

The dropout information, the random number sequence, and the edge may have a bit width formed of binary numbers.

The generating of edge sequence may include generating the edge sequence based on a first ratio of bits in the random number sequence having a bit value of 0 to bits in the random number sequence having a bit value of 1, and a second ratio of bits in the dropout information having a bit value indicating a connected edge to bits in the dropout information having a bit value indicating a disconnected edge.

The generating of edge sequence may include generating the edge sequence based on a pattern of bits in the random number sequence having a bit value of 0 and bits in the random number sequence having a bit value of 1 and a pattern of bits in the dropout information having a bit value indicating a connected edge and bits in the dropout information having a bit value indicating a disconnected edge.

The size of the random number sequence may be equal to a quantity of edges in the layer of the deep neural network.

The edge sequence may be a basis for a dropout operation in the layer of the deep neural network.

The encoding method may further include: obtaining weights of the plurality of edges of the layer of the deep neural network; performing a pruning operation based on a result of comparing the weights of the plurality of edges with a preset threshold weight; and generating the edge sequence to indicate connection or disconnection of the plurality of edges of the layer of the deep neural network based on the pruning operation.

The encoding method may further include: receiving an operation result from the deep neural network; determining whether overflow has occurred in the operation result; and performing a dynamic fixed point operation of modifying an expressible range of a value used in the deep neural network based on whether overflow has occurred.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 10A illustrates a process of adjusting a weight of each layer in a learning process, performed by a learning circuit according to an embodiment of the disclosure;

FIG. 10B illustrates a process of adjusting a weight of each layer in a learning process, performed by a learning circuit according to an embodiment of the disclosure;

DETAILED DESCRIPTION

Figure 1A:
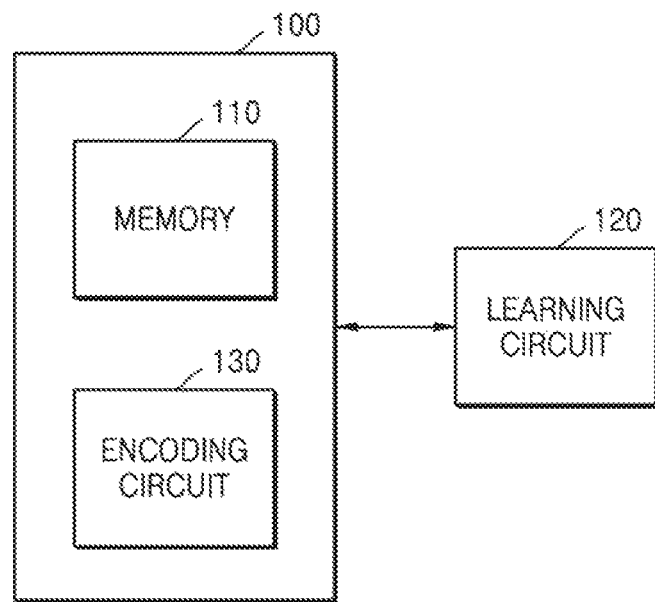
FIG. 1A is a block diagram illustrating an encoding apparatus that generates and processes information needed to perform learning of a deep neural network, and a learning circuit, according to an embodiment of the disclosure.

Reference will now be made in detail to embodiments of the disclosure, examples of which are illustrated in the accompanying drawings, wherein like reference numerals refer to like elements throughout. In this regard, the embodiments of the disclosure may have different forms and should not be construed as being limited to the descriptions set forth herein. Accordingly, the embodiments of the disclosure are merely described below, by referring to the figures, to explain aspects. Expressions such as "at least one of," when preceding a list of elements, modify the entire list of elements and do not modify the individual elements of the list. Throughout the disclosure, the expression "at least one of a, b or c" indicates only a, only b, only c, both a and b, both a and c, both b and c, all of a, b, and c, or variations thereof.

The disclosure may be described in terms of functional block components and various processing steps. Some or all of such functional blocks may be realized by any number of hardware and/or software components configured to perform the specified functions. For example, the functional blocks according to the disclosure may be implemented using one or more microprocessors or circuit components for certain functions. In addition, the functional blocks according to the disclosure may be implemented using various programming or scripting languages. The functional blocks may be implemented using algorithms embodied in software executed on one or more processors. Furthermore, the disclosure could employ any number of techniques of the related art for electronics configuration, signal processing and/or data processing and the like.

Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device.

In addition, terms such as " . . . unit", " . . . module", or the like refer to units that perform at least one function or operation, and the units may be implemented as hardware or software or as a combination of hardware and software. However, the "unit" or "module" may also be stored in an addressable storage medium and implemented by a program which can be executed by a processor.

For example, the "unit" or "module" may be implemented by components such as software components, object-oriented software components, class components and task components, and processes, functions, attributes, procedures, subroutines, segments of program codes, drivers, firmware, microcodes, circuitry, data, database, data structures, tables, arrays, and variables.

Herein, 'inference' is performed in a direction in which output data to be output from an output layer is obtained from input data input to an input layer, and 'learning' may be performed in in a direction in which output data from an output layer is input as input data input to an input layer.

In classification or division of input information via a deep neural network, by inputting input data to an input layer and performing operation via a plurality of layers that form hidden layers of the deep neural network, output data in which input data is classified or assorted or output data corresponding to input data may be output from an output layer.

In order to increase accuracy of output data, after output data is output, a weight value applied to a plurality of layers that form a deep neural network may be adjusted through learning. While adjusting the weight to increase accuracy of output data, overfitting may occur. Due to overfitting, accuracy of trained data may increase, but an output accuracy regarding newly input data may decrease. To address the decrease in accuracy due to overfitting, a dropout operation may be used.

Hereinafter, an encoding apparatus that enables to quickly perform a dropout operation will be described in detail with reference to the drawings.

FIG. 1A is a block diagram illustrating an encoding apparatus 100 that generates and processes information needed to perform learning of a deep neural network, according to an embodiment of the disclosure.

Referring to FIG. 1A, the encoding apparatus 100 includes a memory 110 and an encoding circuit 130 or encoder. In addition, the encoding apparatus 100 may be connected to a learning circuit 120 performing learning of a deep neural network. The encoding apparatus 100 may receive information output during an operation process of the learning circuit 120 and may also transmit information generated in the encoding apparatus 100 to the learning circuit 120.

The learning circuit 120 may perform an operation via a deep neural network including an input layer, a hidden layer, and an output layer. The hidden layer may include a plurality of layers, for example, a first hidden layer, a second hidden layer, and a third hidden layer.

Operation of a deep neural network performed in the learning circuit 120 will be described with reference to FIG. 1B.

Figure 1B:
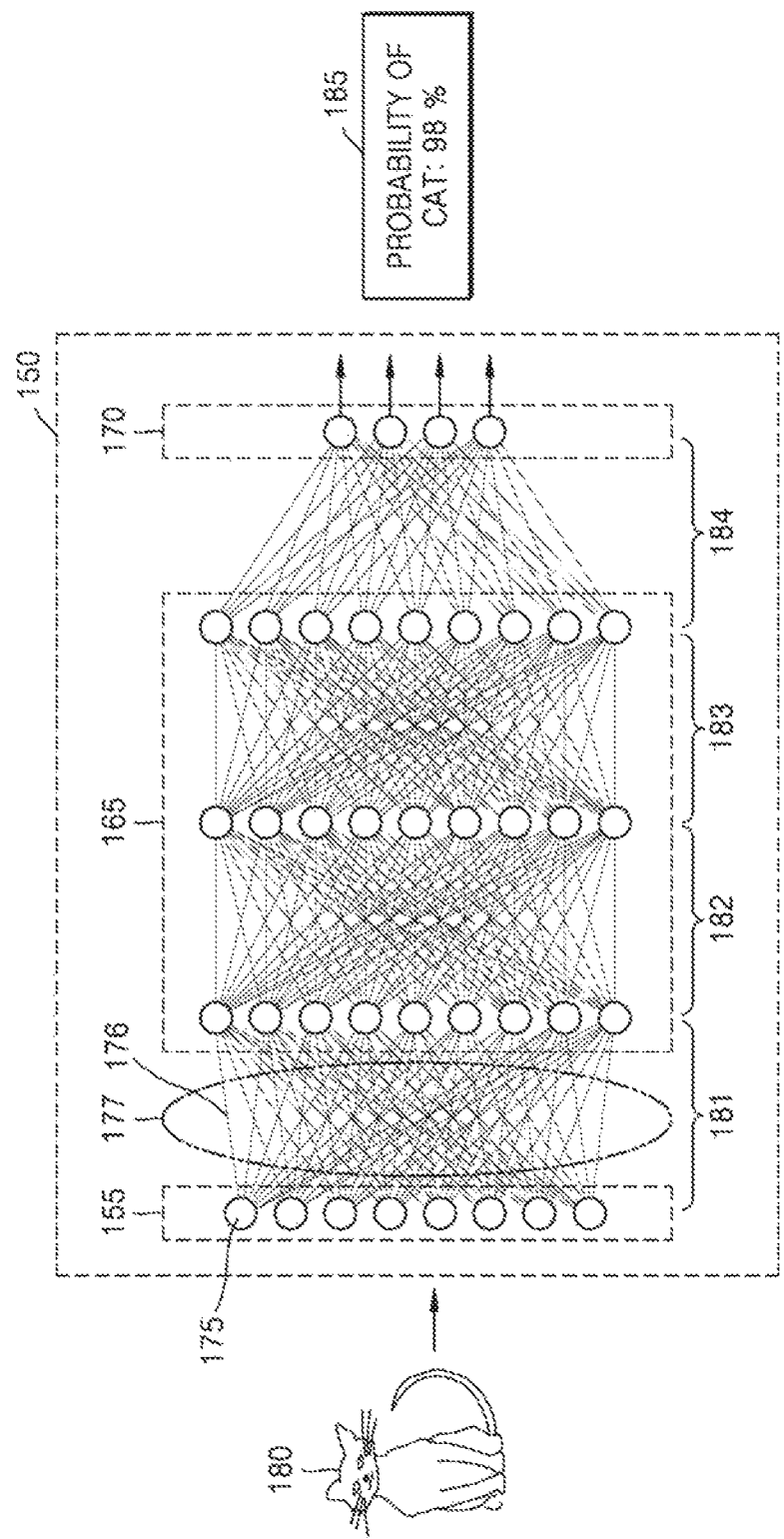
FIG. 1B is a view for describing deep neural network operation performed on a learning circuit processing learning of a deep neural network, according to an embodiment of the disclosure.

Referring to FIG. 1B, a deep neural network 150 includes an input layer 155, a hidden layer 165, and an output layer 170. In FIG. 1B, the deep neural network 150 performs a deep neural network operation of classifying information included in input data and outputting the information is illustrated as an example. In detail, when input data is image data, the deep neural network 150 outputs resultant data including classification of types of image objects included in image data, as output data.

A plurality of layers forming the deep neural network 150 may include a plurality of nodes that receive data, for example, nodes 175 of the input layer 155. In addition, two neighboring layers are interconnected via a plurality of edges 177, for example, nodes 176, as illustrated in FIG. 1B. Each node may be assigned a weight value, and the deep neural network 150 may obtain output data based on an operation performed on an input signal and the weight value. For example, a node 175 may perform a multiplication operation of an input signal and a weight value to generate a product of the input signal and the weight value as an output value. The output value may be output as a result of the deep neural network 150 in the output layer 170, if the node performing the operation exists within the output layer 170, or the output value may be output as an intermediary result in one of the hidden layers 165 and transferred to another node 176 in an adjacent layer 165 via an edge 177, if the node performing the operation exists within a hidden layer 165.

Referring to the embodiment of the disclosure illustrated in FIG. 1B, the input layer 155 receives input data, for example, image data 180 including a cat as an image object.

In addition, referring to FIG. 1B, the deep neural network 150 may consist of a first layer 181 (Layer 1) formed between the input layer 155 and a first hidden layer, a second layer 182 formed between the first hidden layer and a second hidden layer, a third layer 183 formed between the second hidden layer and a third hidden layer, and a fourth layer 184 formed between the third hidden layer and the output layer 170.

A plurality of nodes included in the input layer 155 of the deep neural network 150 receive signals corresponding to the image data 180. In addition, output data 185 corresponding to the image data 180, which has been analyzed by the deep neural network 150, may be output from the output layer 170 via operation in a plurality of layers included in the hidden layer 165. In the illustrated example, an operation for classifying types of image objects included in an input image is performed in the deep neural network 150, and thus, a resultant value which is 'Cat probability: 98%' may be output via output data. In order to increase accuracy of output data output via the deep neural network 150, learning is performed by iteratively passing from the output layer 170 to the input layer 155 an analysis result, and weight values may be iteratively evaluated to increase accuracy of output data.

Referring back to FIG. 1A, the encoding apparatus 100 according to the embodiment of the disclosure may include the memory 110 storing a binary sequence or a bitstream having a certain size and an encoding circuit 130 generating a binary sequence to be output to the learning circuit 120 based on the binary sequence stored in the memory 110. A binary sequence refers to a binary number having a bit size or width equal to or greater than two bits. The learning circuit 120 according to the embodiment of the disclosure may perform an inference process on input information and perform a learning process based on an inference result.

The above-described binary sequence may be information indicating whether edges between nodes constituting a plurality of layers of the deep neural network 150 are connected. In detail, a binary sequence may be information indicating whether each of a plurality of edges formed in a layer included in the deep neural network 150 is connected or disconnected. For example, referring to FIG. 1B, a binary sequence may be information related to an edge sequence indicating whether each of a plurality of edges 177 are included in a certain layer, for example, in a first layer 181, is connected or disconnected.

For example, a value 0 included in a binary sequence may indicate disconnection of a certain edge, and 1 of the binary sequence may indicate connection of a certain edge. Hereinafter, a binary sequence, which is information indicating whether edges included in a certain layer included in the deep neural network 150 are connected, will be referred to as an edge sequence.

Referring to FIG. 1A, the encoding apparatus 100 may include the memory 110 and the encoding circuit 130. The memory 110 may store a first edge sequence that has been output at a first operational cycle. The encoding circuit 130 may generate a second edge sequence indicating whether a plurality of edges in a certain layer included in a deep neural network are connected or disconnected, based on a random number sequence and a first edge sequence obtained at a second operational cycle different from the first operational cycle. The learning circuit 120 may configured the neural network 150 to connect or disconnect each of a plurality of edges in a certain layer based on the second edge sequence generated by using the encoding circuit 130.

Here, an operational cycle such as a first operational cycle or a second operational cycle may refer to one operational cycle including a period of time from a certain operation in a certain layer in a deep neural network starts until the end of the operation. In addition, an operational cycle that occurs first in time may be referred to as a first operational cycle, and a second operational cycle may occur subsequent to the first operational cycle. The second operational cycle may occur immediately after the first operational cycle without any intervening operational cycles, or may not occur immediately after the first operational cycle in time with one or more intervening operational cycles between the first operational cycle and the second operational cycle.

For example, when the encoding circuit 130 performs learning via the deep neural network 150, the first operational cycle may be an operational cycle at which learning in the fourth layer 184 is performed, and the second operational cycle may be an operational cycle in which learning in the third layer 183 is performed.

According to an embodiment of the disclosure, the encoding circuit 130 may operate according to a certain operational cycle and may generate an edge sequence to be output to the learning circuit 120, at each operational cycle. According to an embodiment of the disclosure, the encoding circuit 130 may generate a second edge sequence based on a first edge sequence stored in the memory 110 and transfer the second edge sequence to the learning circuit 120 to determine a connection state of an edge in a deep neural network. According to an embodiment of the disclosure, the first edge sequence may have been already generated at an operational cycle different from an operational cycle, at which the encoding circuit 130 is about to generate a second edge sequence, and used by the learning circuit 120, and stored in the memory 110. According to an embodiment of the disclosure, an edge sequence stored in the memory 110 may be stored in accordance with each of a plurality of layers included in a deep neural network. For example, the memory 110 may store a first edge sequence output at a first operational cycle preceding a second operational cycle in time. The first edge sequence may be a binary sequence indicating connection or disconnection of each of a plurality of edges included in a certain layer included in the deep neural network 150, for example, in the fourth layer 184, and the memory 110 may store the first edge sequence as a value associated with a certain layer, for example, the fourth layer 184. In addition, the memory 110 may store each of at least one of edge sequences that have been respectively output from operational cycles that precede a current operational cycle.

According to another example, a first edge sequence stored in the memory 110 may be stored as one sequence indicating a connected state of all edges included in a plurality of layers included in a deep neural network. Operations that may be performed by the encoding apparatus 100 will be described in detail later with reference to various embodiments of the disclosure.

Figure 2:
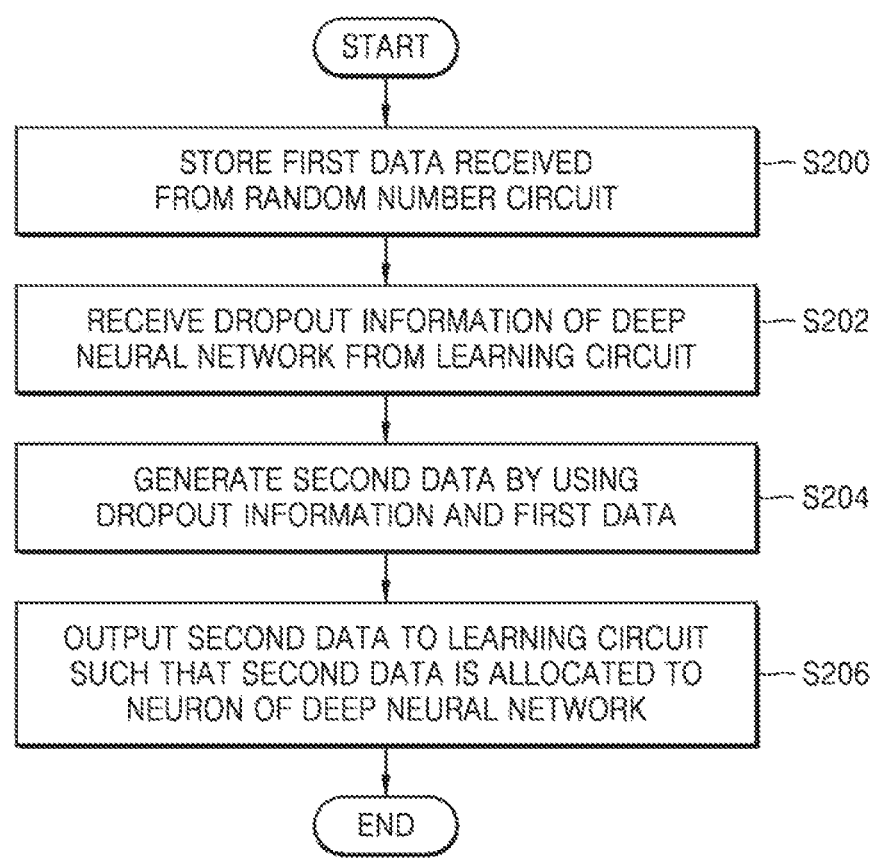
FIG. 2 is a flowchart of an encoding method performed by using an encoding apparatus, according to an embodiment of the disclosure.

FIG. 2 is a flowchart of an encoding method performed by using an encoding apparatus 100, according to an embodiment of the disclosure.

In operation S200, the encoding apparatus 100 may store first data received from a random number generation circuit or random number generator. The first data may be data including a random number sequence output via a clock signal of the random number generation circuit. A random number sequence will be described in detail with reference to FIGS. 4 and 5.

Meanwhile, the encoding apparatus 100 may store not only first data received from a random number generation circuit, but also a first edge sequence that has been output at a first operational cycle of a deep neural network. According to an embodiment of the disclosure, the first edge sequence may have been used to disconnect at least one of a plurality of edges formed between layers of the deep neural network during a learning process of the learning circuit 120 performed at the first operational cycle.

In operation S202, the encoding apparatus 100 may receive dropout information of the deep neural network from the learning circuit 120. Dropout information may refer to a dropout ratio of an edge sequence.

In operation S204, the encoding apparatus 100 may generate second data by using dropout information and first data. The second data may indicate a second edge sequence regarding a second operational cycle. The second edge sequence may have an equal value to a random number sequence, but may also be a new type of edge sequence different from other edge sequences. In detail, a second edge sequence may also be generated by correcting at least one random number value included in a random number sequence based on a first edge sequence. A random number sequence may be transmitted only from an external device, for example, a random number generation circuit. However, the random number generation circuit is not limited to the above example, and may also be integrated within the encoding apparatus 100. Likewise, the learning circuit 120 may also be integrated within the encoding apparatus 100.

For example, the encoding circuit 130 according to an embodiment of the disclosure may perform an operation of comparing a first edge sequence with a random number sequence such that a learning process at a second operational cycle is not performed by using an identical edge sequence to a first edge sequence that is used in a learning process at a first operational cycle of the learning circuit 120.

Alternatively, the encoding circuit 130 according to an embodiment of the disclosure may generate a second edge sequence based on a random number sequence and a first edge sequence such that a dropout ratio of each of the first edge sequence and the second edge sequence is maintained at a constant value. Here, a dropout ratio may refer to a ratio between connected edges and disconnected edges of a plurality of edges included in a certain layer. For example, when a value of 0 included in a second edge sequence indicates disconnection of an edge and a value of 1 indicates connection of an edge, a dropout ratio may denote a ratio of the number of bits having a value of 0 to the total number of bits included in the second edge sequence.

Generation of a second edge sequence based on a first edge sequence and a random number sequence will be described with reference to embodiments of the disclosure.

In operation S206, the encoding apparatus 100 may output the second data to the learning circuit 120 such that the second data is allocated to a neuron of the deep neural network.

Figure 3:
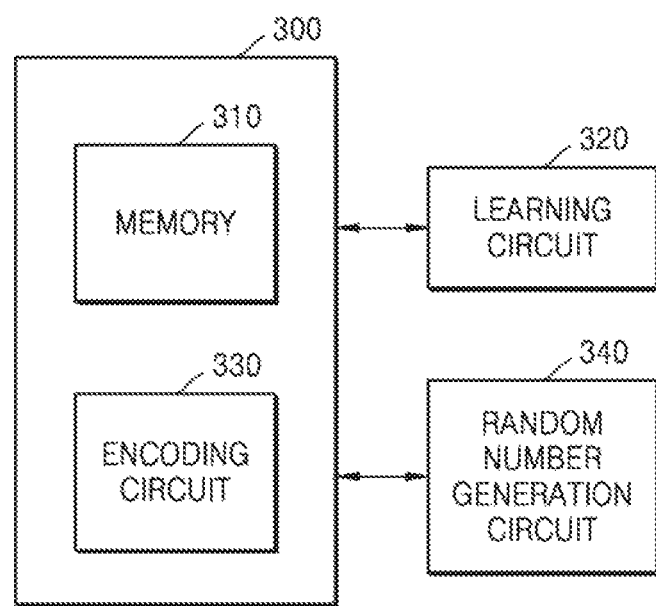
FIG. 3 is a block diagram illustrating an encoding apparatus, a learning circuit, and a random number generation circuit, according to an embodiment of the disclosure.

FIG. 3 is a block diagram illustrating an encoding apparatus 300, a learning circuit 320, and a random number generation circuit 340, according to an embodiment of the disclosure. The encoding apparatus 300, a memory 310, and an encoding circuit 330 of FIG. 3 may respectively correspond to the encoding apparatus 100, the memory 110, and the encoding circuit 130 of FIG. 1. In addition, the learning circuit 320 of FIG. 3 may correspond to the learning circuit 120 of FIG. 1. That is, the encoding apparatus 300 of FIG. 3 may further include a random number generation circuit 340 compared to the encoding apparatus 100 illustrated in FIG. 1A.

According to an embodiment of the disclosure, the random number generation circuit 340 continuously generates a plurality of random numbers. The plurality of random numbers output from the random number generation circuit 340 are in a sequence form and consecutively generated in time, and thus, the plurality of random numbers generated in the random number generation circuit 340 may be referred to as a random number sequence.

In detail, the random number generation circuit 340 according to an embodiment of the disclosure may generate a random number based on a clock signal as a register including a plurality or register cells. Each of the plurality of register cells may be formed as a flip-flop. In addition, the random number generation circuit 340 may store the generated random numbers. The random number generation circuit 340 may store a random number sequence including at least one random number generated in each clock cycle and transmit the stored random number sequence to the encoding circuit 330 according to a clock signal. According to an embodiment of the disclosure, to prevent generation of a random number sequence having an equal value or an identical pattern in the random number generation circuit 340, the random number generation circuit 340 may include at least one logic circuit gate connected to a flip-flop.

The encoding circuit 330 may receive a random number sequence generated in the random number generation circuit 340 and may determine whether to output the received random number sequence as a second edge sequence identical to the received random number sequence based on the random number sequence or to process the received random number sequence and output the processed random number sequence as a second edge sequence.

Figure 4:
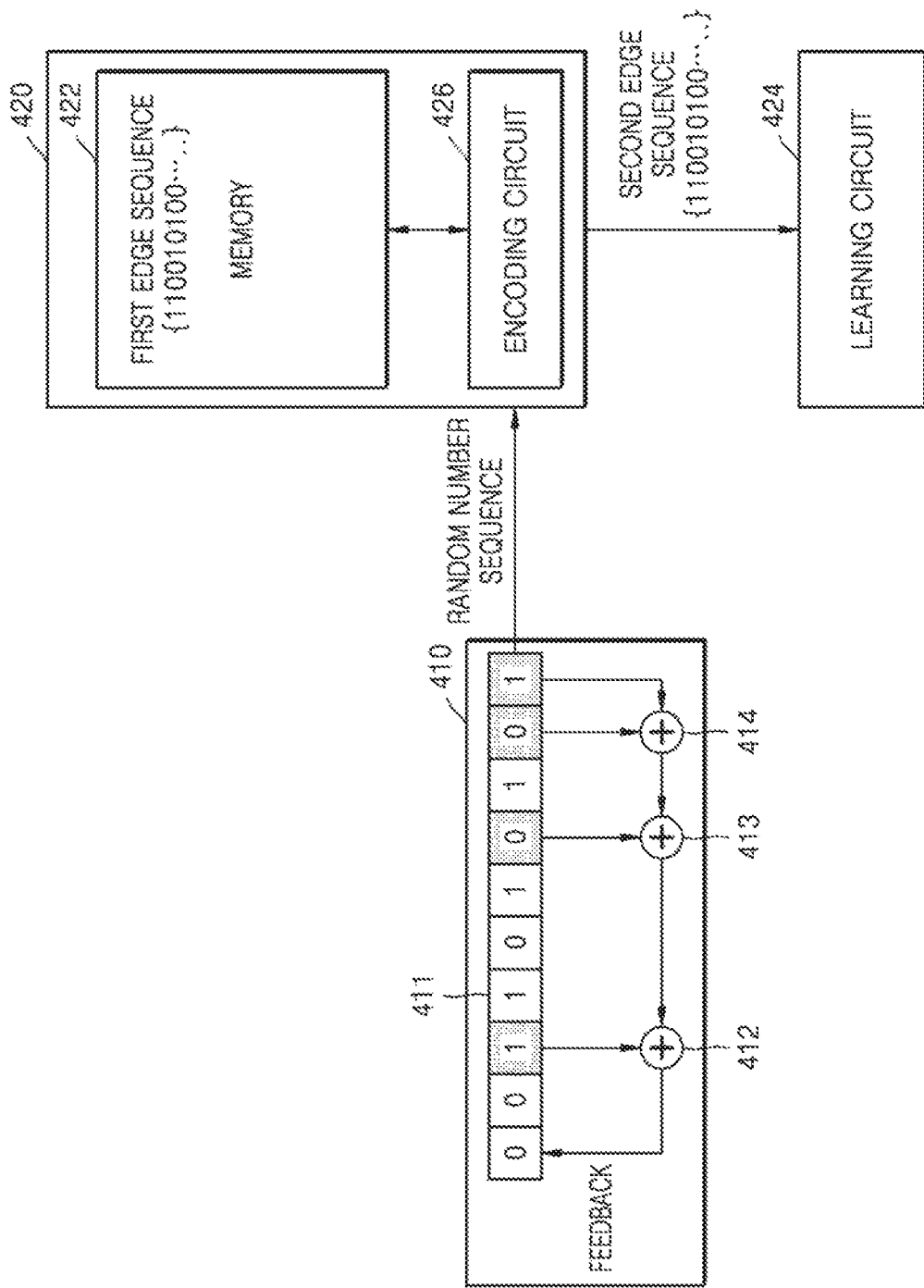
FIG. 4 is a view for describing a method of outputting an edge sequence to be used in a learning process of a deep neural network in an encoding apparatus, according to an embodiment of the disclosure.

FIG. 4 is a view for describing a method of outputting an edge sequence to be used in a learning process of a deep neural network in an encoding apparatus, according to an embodiment of the disclosure.

A random number generation circuit 410 according to an embodiment of the disclosure may include a linear feedback shift register (LFSR) generating a random number sequence.

For example, the random number generation circuit 410 may include a shift register 411 including a plurality of register cells and at least one exclusive or (XOR) gate 412, 413, and 414 connected to the shift register 411. The at least one XOR gate may conduct an exclusive OR operation on input values and may output operated output values at least to an input end of the shift register 411. Accordingly, the random number generation circuit 410 may generate a random number sequence having a value that continuously varies according to time. In addition, the random number generation circuit 410 may include various types of hardware components that generate a random number.

The random number generation circuit 410 may shift a bit value stored in the shift register 411 in response to an input clock signal and generate a random number sequence. In detail, the random number generation circuit 410 may shift bit values stored in the shift register 411 at a rising edge or a falling edge of a clock signal and generate a random number sequence.

In addition, a random number sequence may include a plurality of random numbers obtained at a first clock cycle. The first clock cycle may refer to a cycle of a clock signal needed to generate a random number sequence having a certain size. For example, when the random number generation circuit 410 shifts bit values stored in the shift register 411 at each of a rising edge and a falling edge of a clock signal, a 2-bit random number may be generated from one clock cycle. Thus, to generate a random number sequence having a 100-bit size, fifty clock cycles are required, and in this case, a first clock cycle may include a time section including fifty clock cycles.

Here, a size of a random number sequence may be determined based on the number of edges of the certain layer included in the deep neural network 150. For example, when the number of edges formed in a certain layer of the deep neural network 150, for example, the first layer 181, is 100, a random number sequence having a 100-bit size may be formed, and bit values included in the 100 bits may each have information corresponding to connection or disconnection of the 100 edges. In addition, a size of an edge sequence generated by an encoding circuit 426, including a first edge sequence, may be determined based on the number of edges in a certain layer included in the deep neural network 150 and may be an identical to that of the random number sequence.

However, the random number generation circuit 410 is merely an example of an element that generates a random number by using a hardware component operating according to a clock signal, and thus, may include various hardware components that generate a random number.

Figure 5:
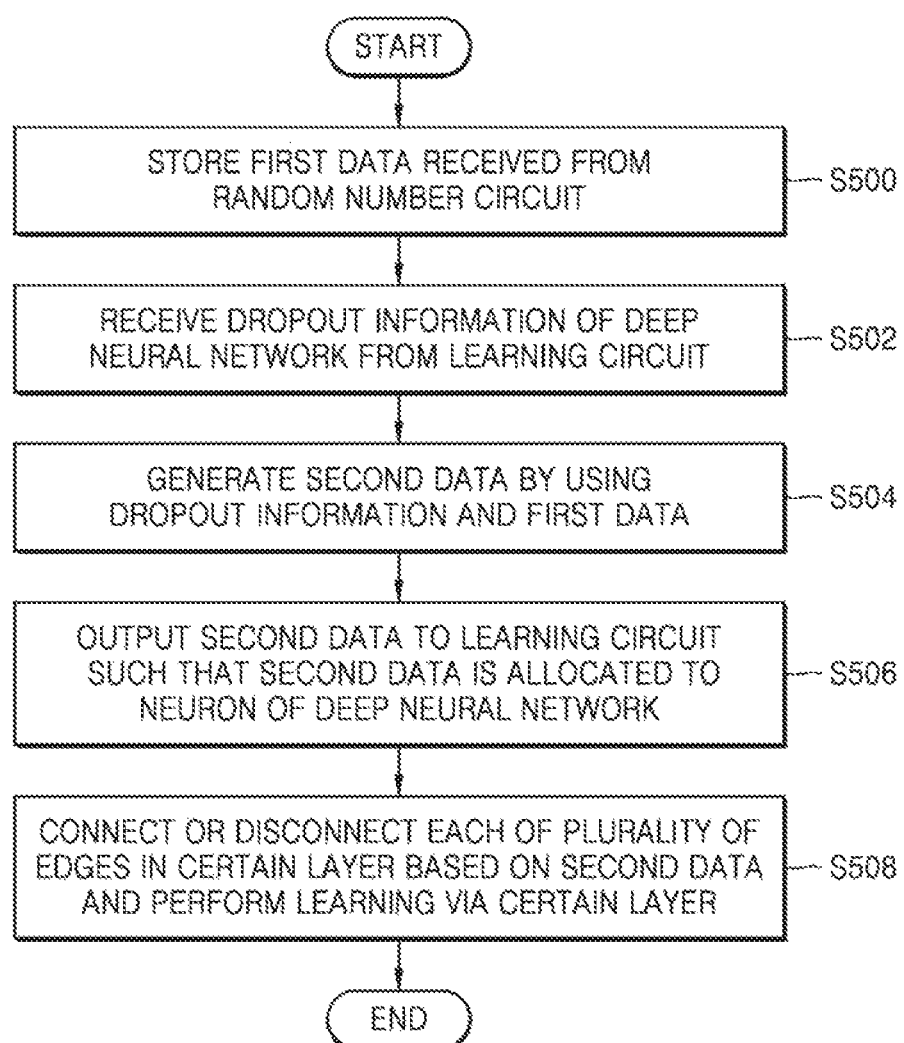
FIG. 5 is a flowchart of an encoding apparatus performed by using an encoding apparatus, according to another embodiment of the disclosure.

FIG. 5 is a flowchart of an encoding method performed by using an encoding apparatus, according to another embodiment of the disclosure.

In operation S500, a memory 422 of an encoding apparatus 420 may store first data received from the random number generation circuit 410. The first data may be data including a random number sequence output via a clock signal of the random number generation circuit 410. In addition, the encoding apparatus 420 may store a first edge sequence that has been output at a first operational cycle.

According to an embodiment of the disclosure, a size of a random number sequence generated in the random number generation circuit 410 may be identical to that of a first edge sequence. According to an embodiment of the disclosure, a first edge sequence may be information indicating a connection state implemented in a learning process of a plurality of edges included in a certain layer at a first operational cycle. That is, a first edge sequence may be information indicating whether edges included in a certain layer are connected or disconnected during a previous learning process and have a bit width equal to the number of edges included in the certain layer.

A bit number that may be generated in the random number generation circuit 410 according to an embodiment of the disclosure may have a bit width larger than a maximum number of edges of each of layers of a deep neural network used in a learning circuit 424. According to an embodiment of the disclosure, the random number generation circuit 410 may generate a binary sequence having a size corresponding to the number of edges of a certain layer during a process of generating a random number sequence to be transmitted to the encoding circuit 426. According to another embodiment of the disclosure, the encoding circuit 426 may use a portion of a binary sequence generated in the random number generation circuit 410, based on the number of edges included in a certain layer, as a random number sequence to be compared with a first edge sequence.

In operation S502, the encoding apparatus 420 may receive dropout information of the deep neural network from the learning circuit 424.

In operation S504, the encoding apparatus 420 may generate second data by using dropout information and first data. In other words, the encoding apparatus 420 may generate a second edge sequence indicating connection or disconnection of a plurality of edges in a certain layer included in the deep neural network, based on a random number sequence and a first edge sequence.

In operation S506, the encoding apparatus 420 may output the second data to the learning circuit 424 to be allocated to a neuron of the deep neural network. That is, the encoding apparatus 420 may output the second edge sequence to the learning circuit 424, and accordingly, the learning circuit 424 may connect or disconnect each of the plurality of edges in the certain layer based on the second edge sequence and perform learning via the certain layer.

In detail, the encoding circuit 426 may generate a second edge sequence such that a ratio between the number of connected edges and the number of disconnected edges in each of all the layers included in the deep neural network 150 is constant.

Referring to the deep neural network 150 illustrated in FIG. 1B, an example in which a first edge sequence indicates connection or disconnection of each of a plurality of edges included in the third layer 183, and a second edge sequence includes pieces of information indicating connection or disconnection of each of a plurality of edges included in the second layer 182 is presented. In addition, a first ratio value, which is a ratio of the number of bits having a value of 0 with respect to the total bit number in the first edge sequence, may indicate a ratio between the number of a plurality of edges included in the third layer 183 and the number of disconnected edges. In addition, a second ratio value, which is a ratio of the number of bits having a value of 0 with respect to the total bit number in the second edge sequence, may indicate a ratio between the number of a plurality of edges included in the second layer 182 and the number of disconnected edges. When the first ratio value is 40% and a target value of a ratio of disconnected edges from among total edges included in the deep neural network 150 is 50%, the encoding circuit 426 may process a random number sequence such that the second ratio value of the second edge sequence is 60% so that the ratio of disconnected edges from among the total edges is 50%. The target ratio value may be set by a user or set by the learning circuit 424 itself.

Alternatively, the encoding circuit 426 may also generate a second edge sequence such that an output edge sequence has a target value which is a constantly identical ratio value.

For example, when a target value is set as 50%, the encoding circuit 426 may generate a second edge sequence such that a ratio value of the number of bits having a value of 0 in the output second edge sequence is 50%. In this case, a first edge sequence and a random number sequence may be compared to correct the random number sequence to have a different pattern from the first edge sequence, and the corrected random number sequence may be generated as a second edge sequence. For example, when a random number sequence is 1000100111 and a previously output first edge sequence is 1000100111, a ratio value of each of the random number sequence and the first edge sequence is 50%, that is, an equal value. Thus, the encoding circuit 426 may generate 0111011000 obtained by conducting a reverse operation (NOT) on the random number sequence, as a second edge sequence, so that the first edge sequence and the second edge sequence have different patterns.

As described above, when defining the number of disconnected edges with respect to the total number of edges in each of layers forming the deep neural network 150, as a 'ratio value' or a 'dropout ratio', an operation of uniformly adjusting a ratio value in the plurality of layers included in the deep neural network 150 may be referred to as a balancing operation. As in the above-described example, the encoding circuit 426 may perform a balancing operation to generate a second edge sequence.

In operation S508, the encoding apparatus 420 may connect or disconnect each of a plurality of edges in a certain layer based on second data and perform learning via the certain layer.

Figure 6:
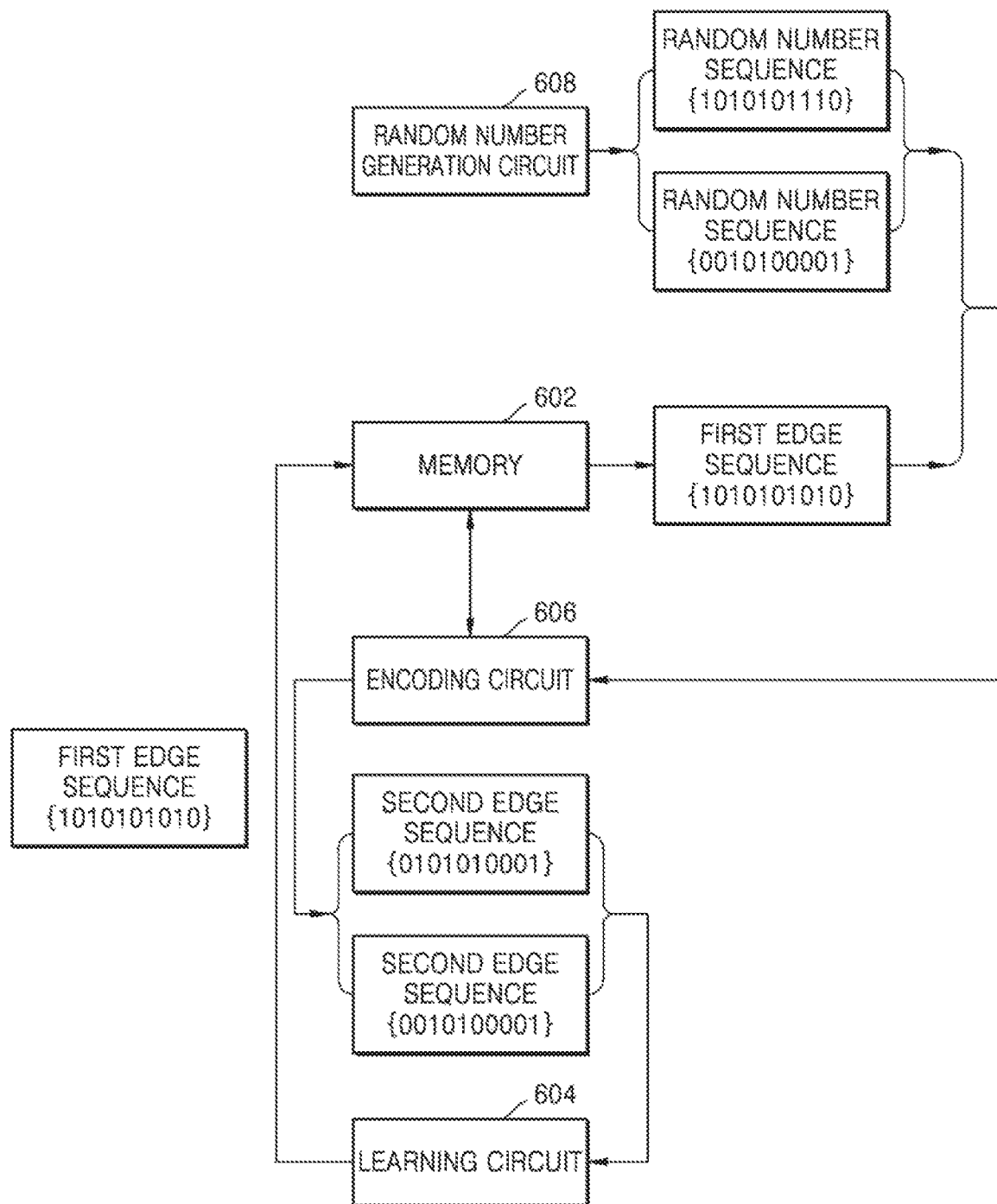
FIG. 6 is a view for describing a method of determining a second edge sequence by comparing a first edge sequence with a random number sequence, by using an encoding apparatus, according to an embodiment of the disclosure.

FIG. 6 is a view for describing a method of determining a second edge sequence by comparing a first edge sequence with a random number sequence, by using an encoding apparatus, according to an embodiment of the disclosure.

A memory 602, a learning circuit 604, and an encoding circuit 606 according to the embodiment of the disclosure may respectively correspond to the memory 110, the learning circuit 120, and the encoding circuit 130 of FIG. 1.

Figure 7:
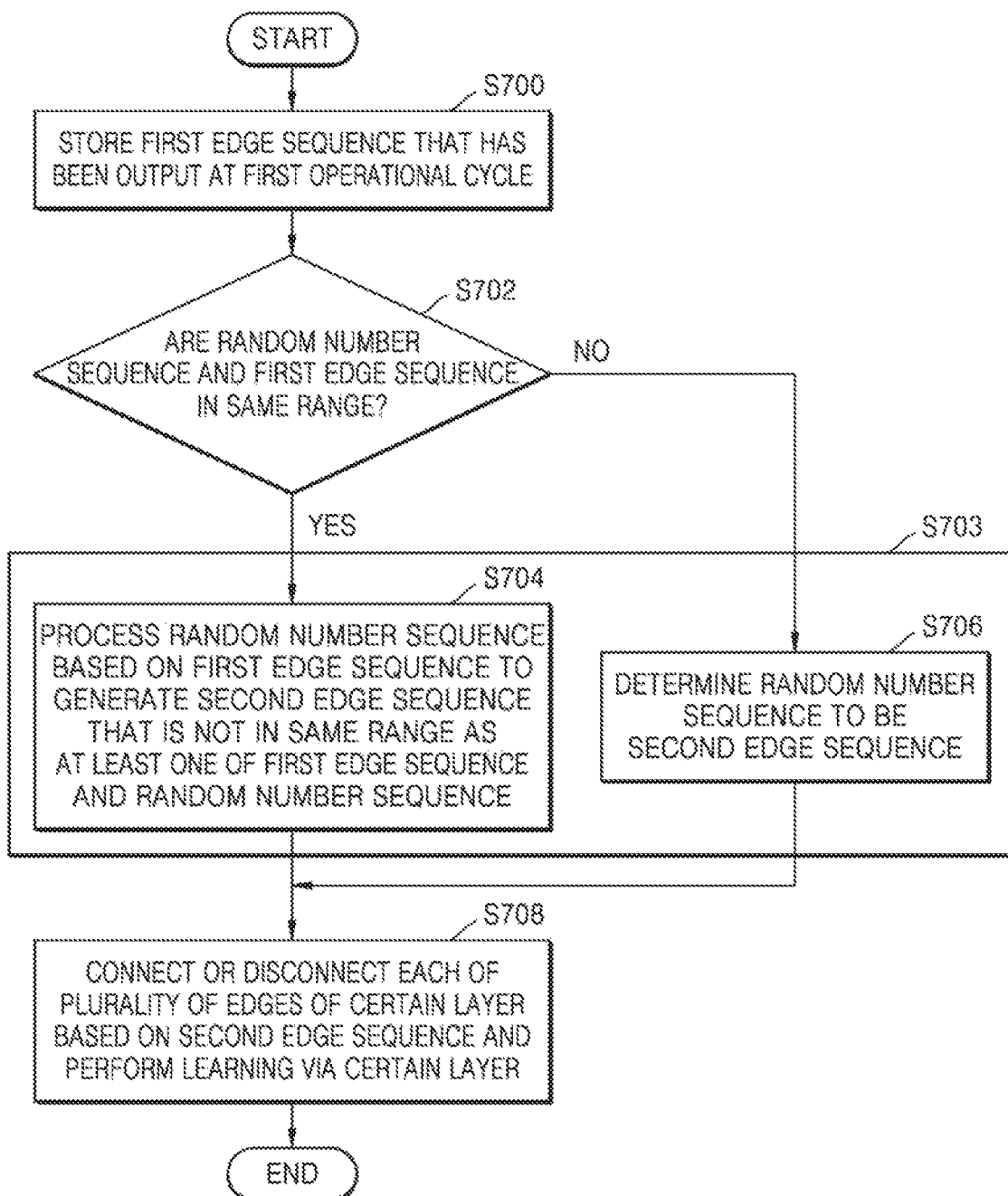
FIG. 7 is a flowchart of a method of determining a second edge sequence by comparing a first edge sequence with a random number sequence, according to an embodiment of the disclosure.

FIG. 7 is a flowchart of a method of determining a second edge sequence by comparing a first edge sequence with a random number sequence, according to an embodiment of the disclosure.

In operation S700, according to an embodiment of the disclosure, the memory 602 may store a first edge sequence that has been output at a first operational cycle.

In operation S702, according to an embodiment of the disclosure, the encoding circuit 606 may determine whether a random number sequence and the first edge sequence are in a same range. The random number sequence may include at least one random number sequence obtained at a first clock cycle.

According to an embodiment of the disclosure, the encoding circuit 606 may determine whether binary numbers constituting the first edge sequence and the random number sequence are identical (S702). In operation S702, the term 'identical' may indicate that two sequences have a substantially identical pattern to have an equal binary value. In addition, the term 'identical' may indicate that in a random number sequence or a first edge sequence, a value of 0 or 1 included in the sequence have an 'equal ratio.' In addition, the term 'identical' may be determined based on whether the number of bits having different values between a first edge sequence and a second edge sequence is equal to or less than a preset threshold. For example, when the number of bits having different values between a first edge sequence and a second edge sequence is 10% or less of the total bit number, a random number sequence and the first edge sequence may be determined to have values within a same range. That is, to determine whether to generate a second edge sequence identical to the random number sequence, the encoding circuit 606 may determine whether a ratio of a value of 0 or 1 included in a sequence is in a same range, even if the random number sequence and the first edge sequence are completely identical or not completely identical. According to an embodiment of the disclosure, the encoding circuit 606 may include a comparator comparing a random number sequence with a first edge sequence.

The encoding circuit 606 may generate a second random number sequence based on a result of determining of operation S702 (S703).

In detail, according to an embodiment of the disclosure, when the first edge sequence and the random number sequence are in a same range (S702—YES), in operation S704, the encoding circuit 606 may process the random number sequence based on the first edge sequence and generate a second edge sequence that is not in a same range as at least one of the first edge sequence and the random number sequence.

In regard to embodiments of the disclosure to be described below, including the embodiment of FIG. 6, an example in which the number of edges included in a certain layer included in the deep neural network 150 is 10 and an edge sequence has a binary 10-bit size will be described.

Referring to FIG. 6, according to an embodiment of the disclosure, when an edge sequence used to connect or disconnect an edge of a certain layer at a first operational cycle is 1010101010, the memory 602 may store a binary number sequence, 1010101010, as a first edge sequence.

According to an embodiment of the disclosure, a random number generation circuit 608 may generate a random number sequence including a plurality of random numbers, based on the number of edges of a certain layer. The encoding circuit 606 may compare the random number sequence with the first edge sequence stored in the memory 602. After comparing the random number sequence with the first edge sequence according to an embodiment of the disclosure, when the two sequences are determined to be not in a same range, the encoding circuit 606 may generate a binary number sequence identical to the random number sequence as a second edge sequence.

According to an embodiment of the disclosure, to determine whether the first edge sequence and the random number sequence are included in a same range, the encoding circuit 606 may compare each bit of the first edge sequence with each bit of the random number sequence to determine the number of different bits. The encoding circuit 606 may determine that the first edge sequence and the random number sequence are not in a same range when the number of bits having different values between the first edge sequence and the random number sequence is equal to or greater than a preset threshold.

Referring to FIG. 6, for example, when a threshold is 3, the encoding circuit 606 may compare the first edge sequence and the random number sequence based on the threshold of 3, and as four bits from among bits of each of the first edge sequence (1010101010) and the random number sequence (0010100001) in corresponding positions have different values, and the number of different bit values of correspondingly positioned bits in the first edge sequence and the random number sequence is greater than 3, the first edge sequence and the random number sequence may be determined to be not in a same range. In this case, the encoding circuit 606 may determine the random number sequence (0010100001) as a second edge sequence.

According to another embodiment of the disclosure, the encoding circuit 606 may compare a first edge sequence to a random number sequence based on a threshold of 3. Referring to FIG. 6, only one value of each corresponding bit of each of the first edge sequence (1010101010) and the random number sequence (1010101110) is different, and thus, the number of different bit values of correspondingly positioned bits in the first edge sequence and the random number sequence is equal to or less than the threshold of 3, and the encoding circuit 606 may thus determine that the first edge sequence and the random number sequence are in a same range. In this case, the encoding circuit 606 may generate a new edge sequence that is not in a same range as the first edge sequence, by processing the random number sequence (1010101110) and may generate the processed edge sequence as a second edge sequence and output the same.

For example, the encoding circuit 606 may perform a bit inversion operation (NOT operation) on a random number sequence to generate a new edge sequence by processing the random number sequence included in a same range as the first edge sequence. Referring to FIG. 6, the encoding circuit 606 may change a binary value of bits having a value of 0 in the random number sequence (1010101110) to 1, and 1 to 0, to generate a second edge sequence (0101010001). However, the encoding circuit 606 conducting a bit inversion operation on a random number sequence is merely an embodiment of the disclosure to describe a method of processing a random number sequence, and various methods may be performed such that a random number sequence is not in a same range as a first edge sequence are included in the method of processing a random number sequence, performed by the encoding circuit 606.

According to an embodiment of the disclosure, the encoding circuit 606 may generate a second edge sequence at a second operational cycle, differently from a first edge sequence, based on a first ratio value, which is a ratio of bit values of 0 and 1 included in a random number sequence and a second ratio value, which is a ratio of bit values of 0 and 1 included in the first edge sequence. A 'ratio value' may be defined as a ratio of bit values in a size of a sequence. According to an embodiment of the disclosure, the encoding circuit 606 may determine whether the first ratio value and the second ratio value are in a same range. According to an embodiment of the disclosure, when the first ratio value and the second ratio value are not in a same range, the encoding circuit 606 may generate a second edge sequence that is the same as a random number sequence; when the first ratio value and the second ratio value are included in a same range, the encoding circuit 606 may process the random number sequence to generate a second edge sequence that is not in a same range as the first edge sequence.

According to an embodiment of the disclosure, when a difference in a ratio between the first ratio value and the second ratio value is equal to or less than 20%, the first ratio value and the second ratio value may be determined to be in a same range. For example, when the first ratio value is 30% and the second ratio value is less than 10% and greater than 50%, the second ratio value is not included in a same range as the first ratio value, and thus, the encoding circuit 606 may generate a second edge sequence that is identical to the random number sequence. On the other hand, when the first ratio value is 30% and the second ratio value is equal to or greater than 10% and equal to or less than 50%, the second ratio value is included in a same range as the first ratio value, and thus, the encoding circuit 606 may process the random number sequence to generate a second edge sequence that is not in a same range as the first edge sequence. The encoding circuit 606 may perform an operation on the first ratio value (for example, addition, subtraction or multiplication of a certain value on the first ratio value) to process the first edge sequence and may generate a second edge sequence according to an operation result.

According to an embodiment of the disclosure, the encoding circuit 606 may generate a second edge sequence at a second operational cycle, differently from a first edge sequence, based on a pattern of bit values 0 and 1 included in a random number sequence and a pattern of bit values 0 and 1 included in the first edge sequence. According to an embodiment of the disclosure, the encoding circuit 606 may determine whether the bit values 0 and 1 included in the random number sequence and the first edge sequence are configured in a certain pattern (for example, repetition of at least one binary number at certain intervals). According to an embodiment of the disclosure, the encoding circuit 606 may determine whether the random number sequence and the first edge sequence have a certain pattern. When the random number sequence and the first edge sequence are determined to be in a same range, the encoding circuit 606 may process the random number sequence to determine a second edge sequence that is not in a same range as the first edge sequence. Methods performed by the encoding circuit 606 to process a random number sequence may be the methods described with reference to the various methods in the disclosure.

According to an embodiment of the disclosure, the encoding circuit 606 may process a random number sequence by using one of a plurality of processing methods that may be performed such that the random number sequence is not in a same range. According to an embodiment of the disclosure, an execution result of some of the plurality of processing methods that may be performed by the encoding circuit 606 may be in a same range as the first edge sequence. The encoding circuit 606 may determine a second edge sequence by processing a first edge sequence by selecting some of the other processing methods except those processing methods having results included in a same range as the first edge sequence.

According to an embodiment of the disclosure, when a first edge sequence and a random number sequence are determined to be not in a same range (S702-NO), in operation S706, the encoding circuit 606 may determine the random number sequence to be a second edge sequence.

According to an embodiment of the disclosure, the encoding circuit 606 may output the second edge sequence to the learning circuit 604 in operation S708, and accordingly, the learning circuit 604 may connect or disconnect each of a plurality of edges in a certain layer based on the second edge sequence and perform learning via the certain layer.

Figure 8:
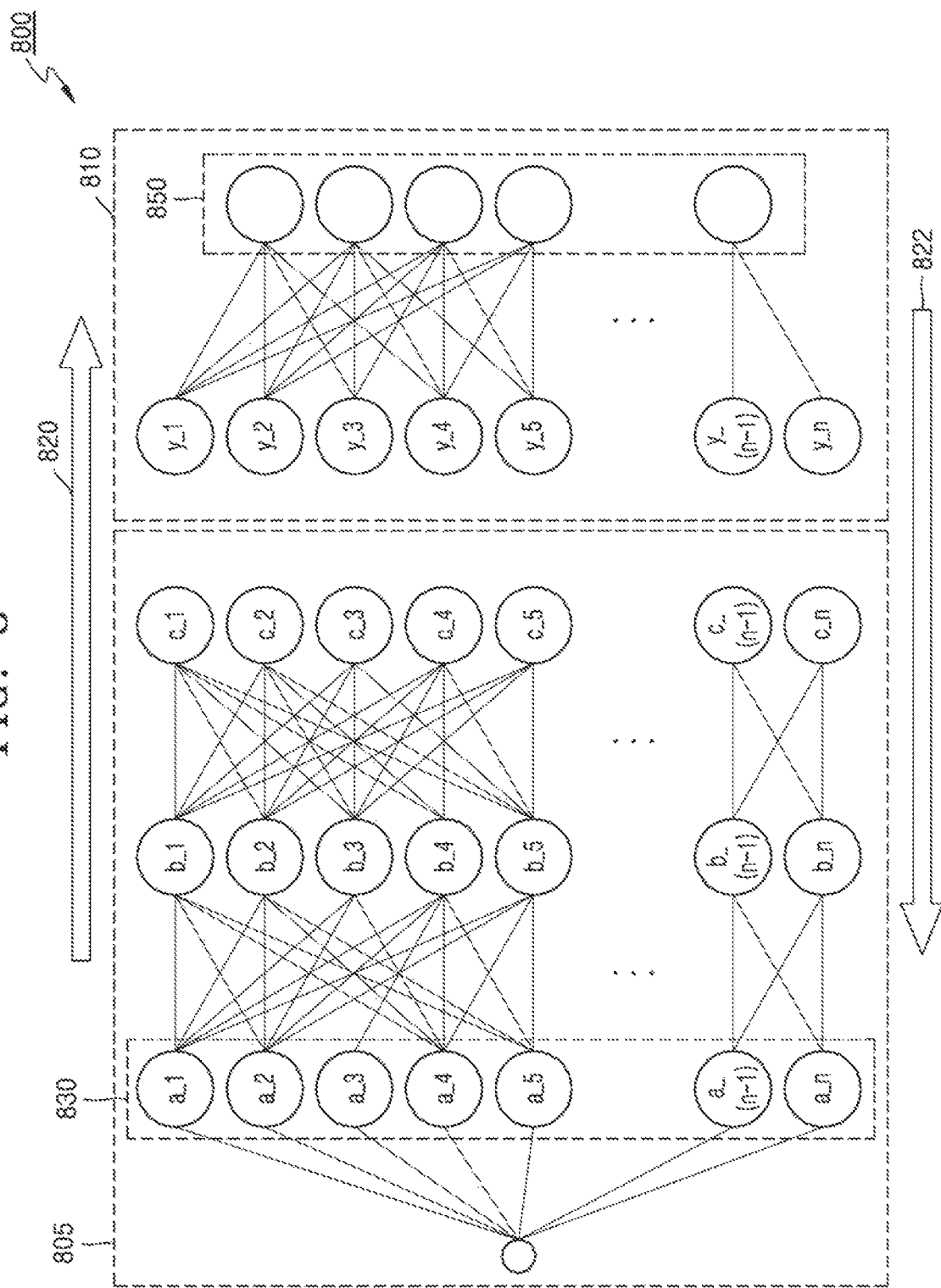
FIG. 8 is a view for describing a deep neural network connected to an encoding apparatus, according to an embodiment of the disclosure.

FIG. 8 is a view for describing a deep neural network 800 connected to an encoding apparatus, according to an embodiment of the disclosure. In FIG. 8, the learning circuit 120 may conduct an operation via the deep neural network 800. The deep neural network 800 corresponds to the deep neural network 150 illustrated in FIG. 1B, and thus repeated description with respect to the embodiment of FIG. 1B will be omitted.

According to an embodiment of the disclosure, the deep neural network 800 may be implemented via the learning circuit 120, and the learning circuit 120 may include various processors including a central processing unit (CPU), a graphics processing unit (GPU), a neural processing unit (NPU), a neural network processor (NNP), or the like. That is, the learning circuit 120 may be an element corresponding to a deep neural network implemented via a hardware component including a semiconductor or the like.

According to an embodiment of the disclosure, the learning circuit 120 may be manufactured as an exclusive hardware form for a deep neural network in which AI is implemented. In addition, a part of a data processing process of the learning circuit 120 disclosed in various embodiments of the disclosure may be implemented via another exclusive hardware component for a deep neural network. Further, a part of a data processing process of the learning circuit 120 may be processed by a portion of a general-use processor (for example, a CPU or an application processor) or a graphics-only processor (for example, a GPU). When data is processed by a general-use processor or a graphics-only processor, the data may be processed by at least one software module, and the at least one software module may be provided via an operating system (OS) or an application.

According to an embodiment of the disclosure, the deep neural network 800 may include a deep neural network having various configurations including a Convolutional Neural Network (CNN), a Recursive Neural Network (RNN) or the like. That is, according to an embodiment of the disclosure, the learning circuit 120 may be a processor implementing a deep neural network of various forms, including a plurality of hidden layers. In particular, a CNN is widely used in image recognition, inference, and classification, and an RNN is widely used in sequential data learning of voice, music, character strings, moving pictures, etc.

Referring to FIG. 8, the deep neural network 800 may include a convolutional layer 805 that generates a feature map by performing a convolutional operation based on a filter kernel with respect to an input signal and a fully connected layer 810 that performs an inference or classification process on a plurality of feature maps generated as a result of a convolutional operation. A convolutional operation performed in a convolutional layer 805 requires the amount of operations because a convolutional operation is to be performed by moving a plurality of filter kernels on an input of each layer, by a distance, and a large memory size is required in an inference or classification process on a feature map generated via the convolutional layer 805. Thus, when learning is performed on the convolutional layer 805 and the fully connected layer 810, by removing repetitive weights or edges or by performing rescaling, the amount of operations and a memory size may be efficiently reduced without a large reduction in accuracy in inference. Thus, not only in the CNN illustrated in FIG. 8, but also in an RNN that includes only fully connected layers, weights and edges used in a network in various embodiments of the disclosure may be efficiently controlled. Examples of methods of controlling weights and edges used in a deep neural network according to an embodiment of the disclosure may include drop out, pruning, a dynamic fixed point method, but are not limited thereto.

According to an embodiment of the disclosure, an inference direction 820 and a learning direction 822 of the deep neural network 800 may be opposite of each other. That is, the learning circuit 120 may perform a forward direction inference process in which inference is performed in a direction from an input layer 830 to an output layer 850, to perform an inference process of an input via the deep neural network 800. According to an embodiment of the disclosure, for a more accurate result of inference performed based on the inference direction 820, a reverse learning process in which learning is performed in a direction from an output layer 850 to an input layer 830 may be performed. According to an embodiment of the disclosure, via a learning process performed in a reverse direction, the learning circuit 120 may sequentially perform an operation of adjusting a weight or an edge from a layer close to an output end to a layer close to an input end.

Figure 9:
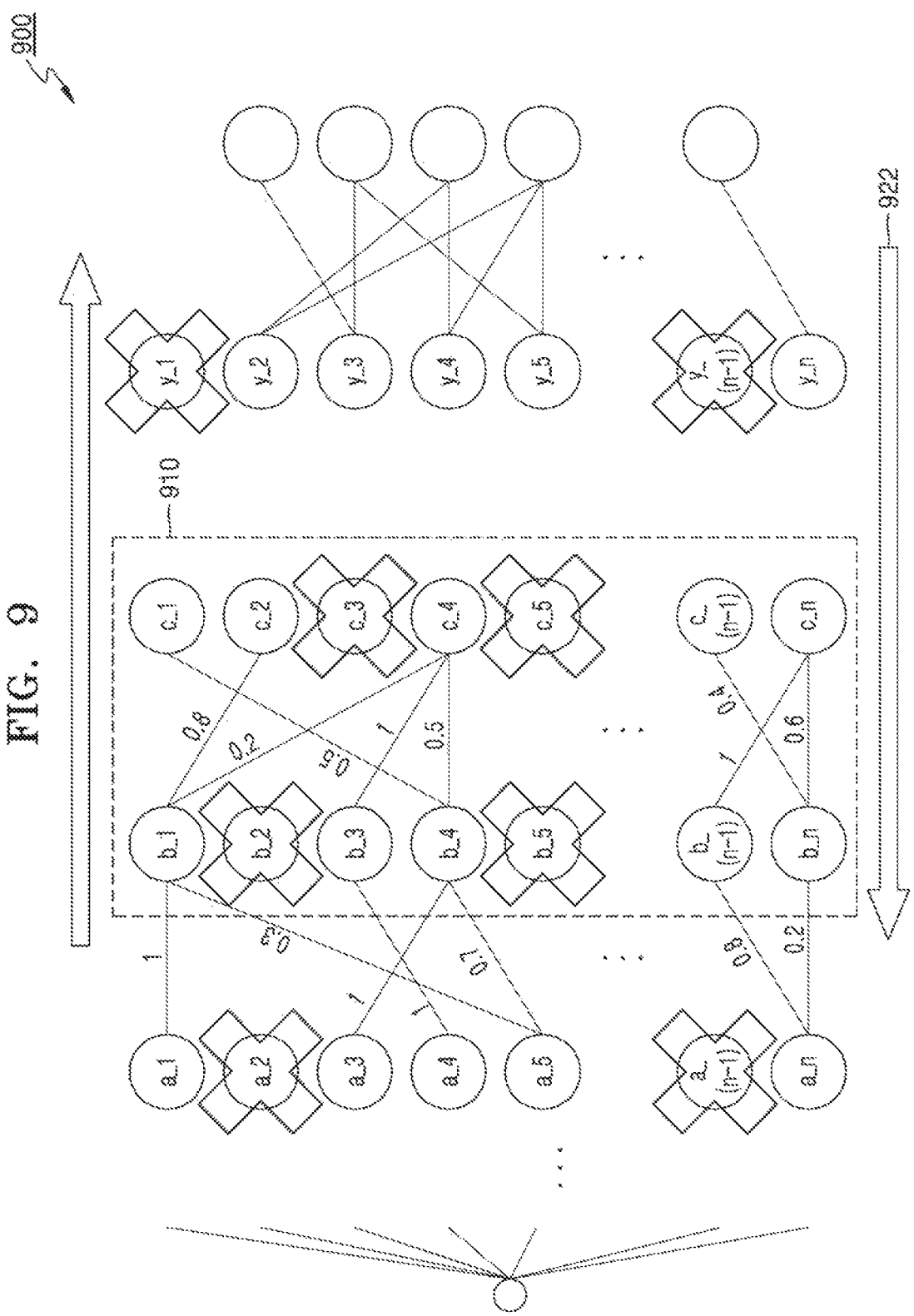
FIG. 9 is a view illustrating a connected or disconnected state of an edge included in each of layers of a deep neural network, according to an embodiment of the disclosure.

FIG. 9 is a view illustrating a connected or disconnected state of an edge included in each of layers of a deep neural network 900, according to an embodiment of the disclosure.

To conduct a dropout operation, certain connected edges in each layer from among the total connected edges are disconnected, as illustrated in FIG. 8.

According to an embodiment of the disclosure, the learning circuit 120 may connect or disconnect a plurality of edges of a layer 910 included in the deep neural network 900 based on a second edge sequence. An edge sequence used by the learning circuit 120 according to an embodiment of the disclosure indicates whether nodes of a certain layer are connected, and may be binary numbers arranged in a certain sequential order. For example, an edge sequence may determine whether an edge of the layer 910 is connected based on a learning direction 922 of the deep neural network 900, and the edge sequence of the layer 910 may be aligned in an order as below. Each column of the table below denotes each bit of the edge sequence. A bit having a value of 0 in the table below may indicate the absence or disconnection of an edge between the nodes indicated in the column. A bit having a value of 1 in the table below may indicate the presence or connection of an edge between the nodes indicated in the column.

| $c\_1 \rightarrow$ $b\_1$ | $c\_1 \rightarrow$ $b\_2$ | ... | $c\_1 \rightarrow$ $b\_n$ | $c\_2 \rightarrow$ $b\_1$ | $c\_2 \rightarrow$ $b\_2$ | ... | $c\_2 \rightarrow$ $b\_n$ | ... | $c\_n \rightarrow$ $b\_1$ | $c\_n \rightarrow$ $b\_2$ | ... | $c\_n \rightarrow$ $b\_n$ |
|---|---|---|---|---|---|---|---|---|---|---|---|---|

In the table above, '$c\_1 \rightarrow b\_1$' means an edge connecting a node $c\_1$ to a node $b\_1$. In the above edge sequence, when a value of a space '$c\_1 \rightarrow b\_1$' is 0, an edge connecting the node $c\_1$ to the node $b\_1$ may be disconnected, as illustrated in FIG. 9. In addition, '$c\_1 \rightarrow b\_4$' indicates an edge connecting the node $c\_1$ to a node $b\_4$ illustrated in FIG. 9. In the above edge sequence, when a value of a space '$c\_1 \rightarrow b\_4$' is 1, an edge connecting the node $c\_1$ to the node $b\_4$ may be connected, as illustrated in FIG. 9.

However, the method of aligning an edge sequence described above is merely an example of determining an order that the learning circuit 120 is to connect or disconnect an edge and may thus include various methods of aligning a binary number sequence that may be generated to easily determine an edge connection state of a plurality of nodes.

According to an embodiment of the disclosure, the learning circuit 120 may determine some of edges included in the layer 910 to be in a disconnected state, based on the obtained second edge sequence. As in the above-described example, as an edge sequence includes information about connection or disconnection of edges included in a certain layer, the learning circuit 120 may disconnect at least some of edges included in at least one layer or all layers included in a deep neural network based on an edge sequence output from the encoding circuit 130. In addition, a dropout operation described above may be performed via a deep neural network that is corrected based on the edge sequence.

In addition, referring to FIG. 9, the learning circuit 120 may disconnect all edges connected to a node $c\_3$ in a learning process of the layer 910 based on the second edge sequence. Accordingly, learning of the layer 910 may be performed while information input to the node $c\_3$ and information output from the node $c\_3$ are all blocked. Referring to FIG. 9, the learning circuit 120 may perform learning while edges of nodes $b\_2$, $b\_5$, $c\_3$, and $c\_5$ of the layer 910 are all disconnected, and may perform dropout by disconnecting all edges of the nodes $b\_2$, $b\_5$, $c\_3$, and $c\_5$. Further, the learning circuit 120 may perform learning by disconnecting not only the edges of the nodes $b\_2$, $b\_5$, $c\_3$, and $c\_5$, but also some of edges connected to other nodes of the layer 910.

FIG. 10A illustrates a process of adjusting a weight of each layer in a learning process, performed by the learning circuit 120, according to an embodiment of the disclosure. FIG. 10B illustrates a process of adjusting a weight of each layer in a learning process, performed by the learning circuit 120, according to an embodiment of the disclosure.

Referring to FIG. 10A, the learning circuit 120 according to an embodiment of the disclosure may perform an inference process by using a plurality of layers including a first layer 1010 and a second layer 1012, and may perform a learning process in a direction in which accuracy of a value output as a result of inference increases. According to an embodiment of the disclosure, a learning process performed by the learning circuit 120 may be in an opposite direction of the method performed in an inference process, and thus, learning on the second layer 1012 begins after learning on the first layer 1010 is ended.

According to an embodiment of the disclosure, the learning circuit 120 may connect or disconnect a plurality of edges of the second layer 1012 included in a deep neural network 1000 based on a second edge sequence. An edge sequence used by the learning circuit 120 according to an embodiment of the disclosure indicates whether each node of a certain layer is connected, and may be binary numbers aligned in a certain order. Referring to FIG. 10A, the learning circuit 120 may omit some of edges connecting the used in the second layer 1012 nodes (nodes b_1, b_2, . . . , b_n, c_1, c_2, . . . , c_n) based on the second edge sequence generated by the encoding circuit 130. The learning circuit 120 may perform learning in a direction in which accuracy of inference of a deep neural network increases, by using edges that are not omitted in a learning process, and may modify weights allocated to edges that are not omitted in the learning process. That is, the learning circuit 120 may perform a learning process of modifying a weight of the second layer 1012 based on an edge connection state determined based on the second edge sequence.

According to an embodiment of the disclosure, when the learning process in the second layer 1012 is ended by the learning circuit 120, a learning process of the first layer 1010 may be started. Referring to FIG. 10A, the learning circuit 120 may perform a learning process of modifying a weight of the second layer 1012 based on the second edge sequence generated by using the encoding circuit 130 at a second operational cycle, and thereby the second layer 1012 may be modified to the trained second layer 1022 of FIG. 10B. The trained second layer 1022 may affect a learning process of the first layer 1020, and accordingly, the first layer 1020 may perform a learning process of modifying a weight included in the first layer 1020 in consideration of a weight of the second layer 1022.

According to an embodiment of the disclosure, the learning circuit 120 may perform an inference process based on weights of a plurality of layers of a deep neural network determined via learning performed at the second operational cycle. In order to increase an accuracy of resultant values output as a result of inference after the second operational cycle, the learning circuit 120 may iteratively repeat the learning process according to the above-described embodiments of the disclosure. Accordingly, the encoding apparatus 100 may store a second edge sequence regarding a layer at the second operational cycle in the memory 110, and perform an inference process based on the trained weight according to the second edge sequence, and then obtain a third edge sequence from the memory 110 at a third operational cycle that is different from the second operational cycle. The third edge sequence may correspond to an edge sequence stored in the memory 110 at the third operational cycle. Thus, the encoding circuit 130 may generate a fourth edge sequence indicating connection or disconnection of a plurality of edges in a certain layer included in a deep neural network based on a random number sequence that is newly generated in response to the third edge sequence and a clock signal, at a fourth operational cycle occurring after the third operational cycle.

The first edge sequence, the second edge sequence, the third edge sequence, and the fourth edge sequence used by the encoding apparatus 100 according to an embodiment of the disclosure correspond to edge sequences that are respectively generated at each operational cycle of the encoding circuit 130 and output to the learning circuit 120, and may be generated and processed according to the above-described various embodiments of the disclosure.

Figure 11:
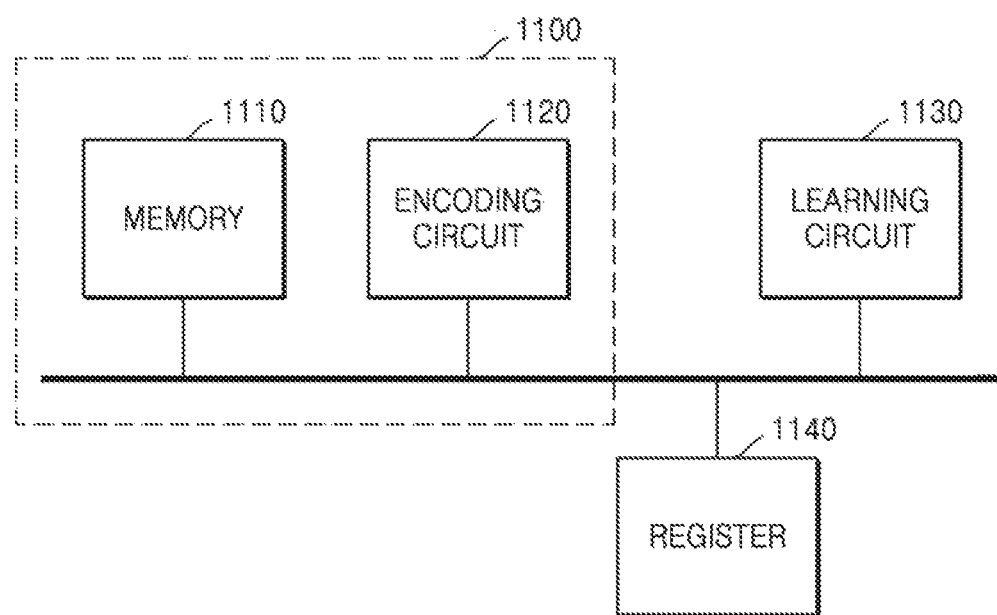
FIG. 11 is a block diagram of an encoding apparatus performing encoding by using a weight of an edge, determined in a previous operational cycle, according to an embodiment of the disclosure.

FIG. 11 is a block diagram of an encoding apparatus 1100 for performing encoding by using a weight of an edge, determined in a previous operational cycle, according to an embodiment of the disclosure.

According to an embodiment of the disclosure, the encoding apparatus 1100 includes a memory 1110 storing a first edge sequence indicating a connection state of a plurality of edges constituting a certain layer determined at a first operational cycle and an encoding circuit 1120 generating a second edge sequence, which is a set of binary numbers indicating a connection state of a plurality of edges of a certain layer, at a second operational cycle different from the first operational cycle. A learning circuit 1130 may perform an inference and learning process based on an edge sequence determined via the encoding circuit 1120. In addition, a register 1140 may store weights of a plurality of edges constituting a certain layer.

According to an embodiment of the disclosure, the memory 1110, the encoding circuit 1120, and the learning circuit 1130 of FIG. 11 may be respectively similar to the memory 110, the encoding circuit 130, and the learning circuit 120 of FIG. 1A, and thus detailed description thereof will be omitted. Hereinafter, a feature of using a weight stored in the register 1140 will be described.

According to an embodiment of the disclosure, the memory 1110 and the register 1140 perform a similar function of storing an edge sequence indicating a connection state of edges and weights of the edges, and thus, features of the memory 1110 and the register 1140 may be implemented by a single component performing a storage function or a plurality of separate memories. However, for convenience of description, the memory 1110 and the register 1140 will be separately described.

Figure 12:
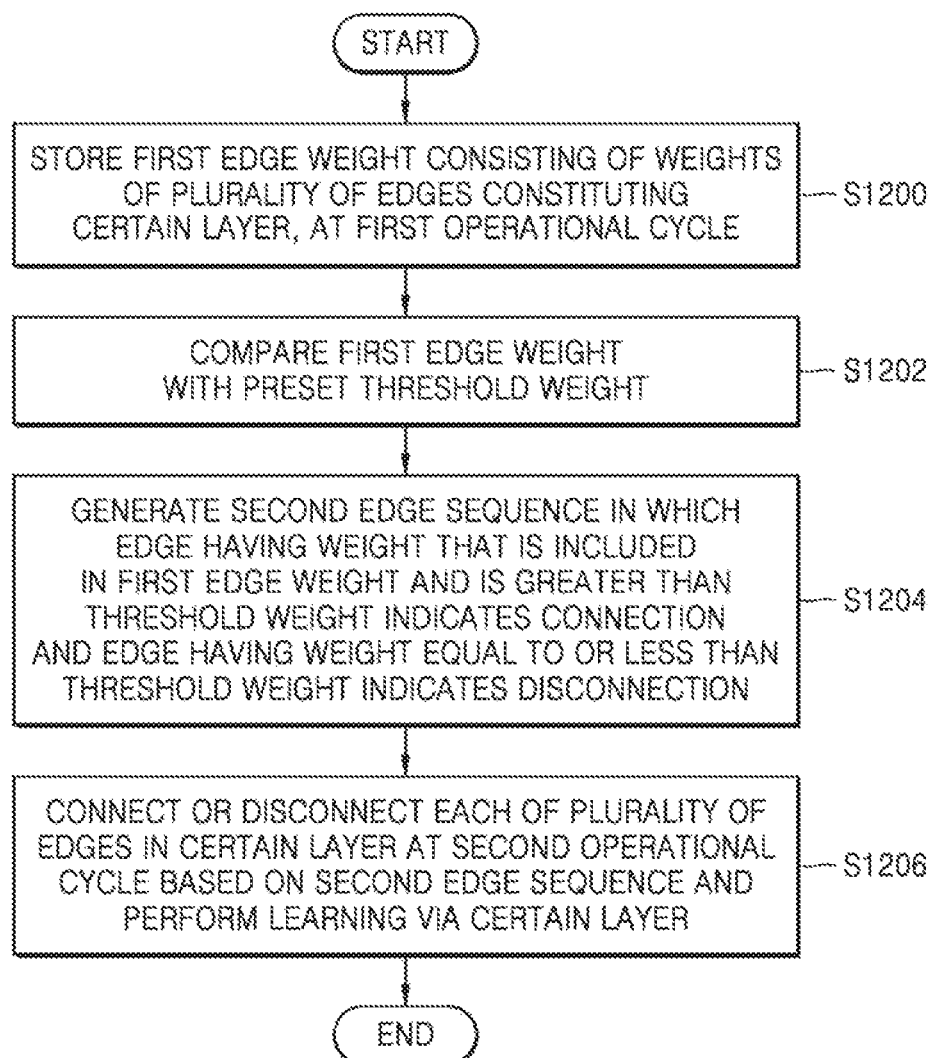
FIG. 12 is a flowchart of a process of generating, performed by an encoding apparatus, a second edge sequence based on weights of a plurality of edges stored on a register, according to an embodiment of the disclosure.

FIG. 12 is a flowchart of a process of generating, performed by an encoding apparatus 1100, a second edge sequence based on weights of a plurality of edges stored in a register 1140, according to an embodiment of the disclosure.

In operation S1200, the register 1140 of the encoding apparatus 1100 may store a first edge weight consisting of weights of a plurality of edges constituting a certain layer according to an embodiment of the disclosure, at a first operational cycle. According to an embodiment of the disclosure, the first edge weight stored in the register 1140 may be information including weights of edges of a certain layer.

In operation S1202, the encoding circuit 1120 of the encoding apparatus 1100 may compare a size of the first edge weight stored in operation S1200 with a size of a preset threshold weight. According to an embodiment of the disclosure, the encoding circuit 1120 may include a comparator for comparison of the first edge weight with a preset threshold weight.

In operation S1204, based on a result of comparison of operation S1202, the encoding circuit 1120 of the encoding apparatus 1100 may generate a second edge sequence in which an edge having a weight that is included in the first edge weight and is greater than the threshold weight indicates connection and an edge having a weight equal to or less than the threshold weight indicates disconnection. According to an embodiment of the disclosure, the second edge sequence may be a binary number sequence, and value of 1 may be information indicating connection of an edge, and value of 0 may be information indicating disconnection of an edge.

In operation S1206, the learning circuit 1130 may connect or disconnect each of a plurality of edges in a certain layer at a second operational cycle based on the second edge sequence received from the encoding circuit 1120, and perform learning via the certain layer. Weights of the plurality of edges determined as a result of learning are stored in the register 1140 again, and may be used in a next operational cycle to be compared with a preset threshold weight. According to an embodiment of the disclosure, the feature of an operation performed by the learning circuit 1130 in operation S1206 may be a feature similar to that of the learning circuit described with reference to the various embodiments of the disclosure, and thus, detailed description thereof will be omitted.

According to an embodiment of the disclosure, the encoding apparatus 1100 may perform a learning process of a deep neural network by using an edge sequence indicating the first edge weight stored in the register 1140 and an edge connection state of a certain layer. According to an embodiment of the disclosure, the learning circuit 1130 may perform a learning process by using a second edge sequence generated based on a result of comparing a first edge sequence stored in the memory 1110 with a random number sequence obtained from a random number generation circuit. The first edge weight determined according to a learning result may be stored in the register 1140, and in a next operational cycle, the encoding circuit 1120 may generate a new edge weight by comparing the first edge weight with a preset threshold weight. The learning circuit 1130 may perform a learning process by using the edge sequence generated in the above-described process.

Figure 13:
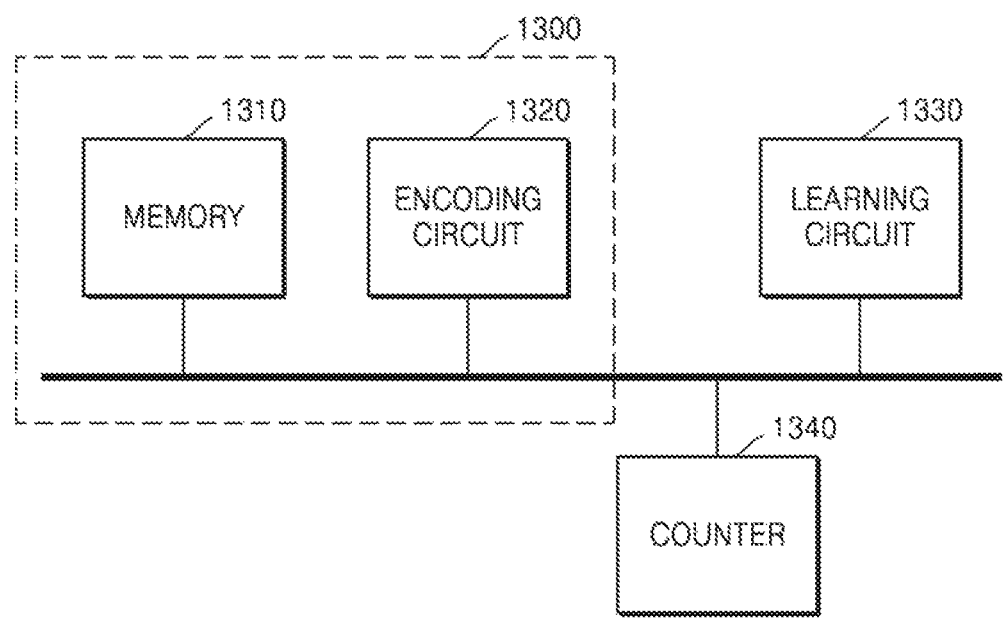
FIG. 13 is a block diagram illustrating an encoding apparatus, a learning circuit, and a counter, according to an embodiment of the disclosure.

FIG. 13 is a block diagram illustrating an encoding apparatus 1300, a learning circuit 1330, and a counter 1340, according to an embodiment of the disclosure.

According to an embodiment of the disclosure, features of a memory 1310, an encoding circuit 1320, and the learning circuit 1330 of FIG. 13 may be similar to the features of the memory 110, the encoding circuit 130, and the learning circuit 120 of FIG. 1A described above, and thus, detailed description thereof will be omitted. Hereinafter, the feature of using a weight stored in the register will be described.

According to an embodiment of the disclosure, the counter 1340 may count a number of times that a certain condition is satisfied during a process in which the encoding circuit 1320 generates a second edge sequence. According to an embodiment of the disclosure, the counter 1340 may include a counting machine that counts a number of occurrences and restart the count upon reaching a maximum count of the number of occurrences, wherein the counting machine may be an element that is designed such that states of flip-flops are transitioned in a predetermined order, and includes a register, a state of which changes in a predetermined order according to an input pulse.

For example, the counter 1340 may count the number of times at which bits of a first edge sequence and bits of a random number sequence are identical in a process of the encoding circuit 1320 of comparing the first edge sequence with the random number sequence. The encoding circuit 1320 may determine whether to generate a second edge sequence by using a random number sequence without any change based on a result of calculation of the counter 1340 or to generate a second edge sequence by processing a random number sequence. Furthermore, the counter 1340 may generate a second edge sequence by calculating a ratio of bit values of 0 included in a first edge sequence (dropout ratio) and a ratio of bit values of 0 included in a random number sequence. The process of generating a second edge sequence by using a dropout ratio, by using the encoding circuit 1320, is described above with reference to various embodiments of the disclosure, and thus, detailed description thereof will be omitted.

According to another example, the encoding circuit 1320 may compare a first edge weight of a certain layer stored in the register 1140 or the memory 1110 of FIG. 11 with a preset threshold weight, and the counter 1340 may calculate the number of edges having a greater weight than the preset threshold weight from among a plurality of edges constituting a certain layer. The encoding circuit 1320 may determine the number of edges in a connected state (or the number of edges in a disconnected state) from among the plurality of edges of the certain layer based on a calculation result of the counter 1340, and may generate a second edge sequence based on the determined number of the edges. The method of generating, by the encoding circuit 1320, a second edge sequence based on a dropout ratio determined based on a calculation result of the counter 1340, is described above with reference to the various embodiments of the disclosure, and thus detailed description thereof will be omitted.

That is, the counter 1340 that may be used in various embodiments of the disclosure may be widely used to calculate a number of times that satisfies a certain condition during a process of comparing a first edge sequence and a random number sequence, a first edge weight or the like. Examples of the counter 1340 may include counters implemented in various flip-flop structures such as an asynchronous counter, a synchronous counter, an UP-counter or the like.

Figure 14:
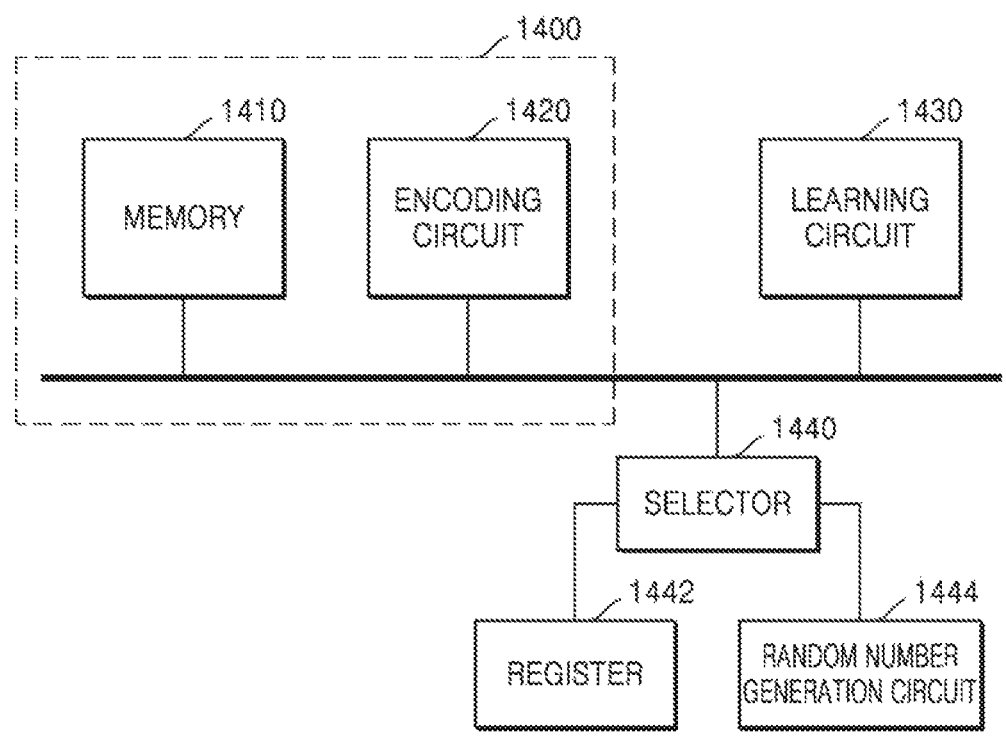
FIG. 14 is a block diagram illustrating an encoding apparatus, a learning apparatus, and a selector, according to an embodiment.

FIG. 14 is a block diagram illustrating an encoding apparatus 1400, a learning circuit 1430, and a selector 1440, according to an embodiment of the disclosure.

According to an embodiment of the disclosure, the encoding apparatus 1400 may include a memory 1410 and an encoding circuit 1420, and may be connected to the learning circuit 1430. In addition, the encoding apparatus 1400 may be connected to the selector 1440, a register 1442, and a random number generation circuit 1444. According to an embodiment of the disclosure, the features of the memory 1410, the encoding circuit 1420, and the learning circuit 1430 may be similar to the above-described features of the memory 110, the encoding circuit 130, and the learning circuit 120, and thus detailed description thereof will be omitted. In addition, the features of the register 1442 and the random number generation circuit 1444 of FIG. 14 may also be similar to the features of the register 1140 of FIG. 11 and the random number generation circuit 340 of FIG. 3, and thus detailed description thereof will be omitted.

Referring to FIG. 14, the selector 1440 may obtain certain information from each of the register 1442 and the random number generation circuit 1444 and selectively output the two pieces of information. According to an embodiment of the disclosure, the selector 1440 may include a multiplexer that obtains a certain selection signal of n bits (n>0) and selectively outputs certain information obtained from the register 1442 and the random number generation circuit 1444, and output information of the register 1442 or the random number generation circuit 1444 may be used by the memory 1410, the encoding circuit 1420, and the learning circuit 1430 as in the above-described various embodiments of the disclosure. That is, the selector 1440 may selectively output input information of 2^n types that may be determined based on an n-bit selection signal.

That is, the encoding apparatus 1400 connected to the selector 1440 may selectively use a process of determining a second edge sequence based on a result of comparing a first edge weight stored in the register 1442 with a preset threshold weight and a process of determining a second edge sequence based on a result of comparing a first edge sequence stored in the memory 1410 with a random number sequence obtained from the random number generation circuit 1444.

In detail, in order for the learning circuit 1430 to perform the above-described dropout operation, the selector 1440 may operate such that a signal generated in the random number generation circuit 1444 is output. Accordingly, a random number sequence output from the random number generation circuit 1444 may be transmitted to the encoding circuit 1420, and the encoding circuit 1420 may generate an edge sequence by using the transmitted random number sequence and transmit the edge sequence to the learning circuit 1430.

In addition, in order for the learning circuit 1430 to perform the above-described pruning operation, the selector 1440 may operate such that a signal stored in the register 1442 is output. Accordingly, weight values output from the register 1442 may be transmitted to the learning circuit 1430. Accordingly, the learning circuit 1430 may perform learning based on the weight values transmitted from the register 1442, or may perform a correction operation of the weight values in a direction in which accuracy increases.

Figure 15:
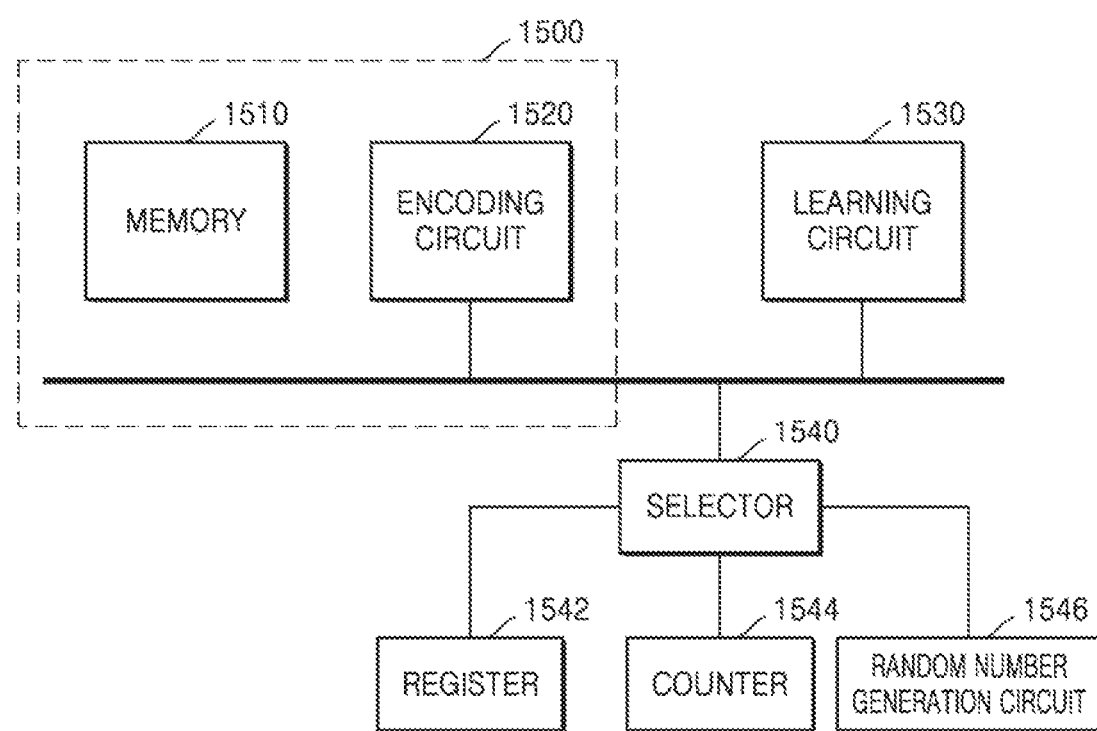
FIG. 15 is a block diagram illustrating an encoding apparatus, a learning circuit, a register, a counter, a random number generation circuit, and a selector, according to an embodiment of the disclosure.

FIG. 15 is a block diagram illustrating an encoding apparatus 1500, a learning circuit 1530, a register 1542, a counter 1544, a random number generation circuit 1546, and a selector 1540, according to an embodiment of the disclosure.

According to an embodiment of the disclosure, the features of a memory 1510, an encoding circuit 1520, and the learning circuit 1530 of FIG. 15 may be similar to those of the memory 110, the encoding circuit 130, and the learning circuit 120 of FIG. 1A, and thus detailed description thereof will be omitted. In addition, the features of the register 1542, the counter 1544, and the random number generation circuit 1546 of FIG. 15 may be respectively similar to those of the register 1140 of FIG. 11, the counter 1340 of FIG. 1340, and the random number generation circuit 340 of FIG. 3, and thus detailed description thereof will be omitted.

According to an embodiment of the disclosure, the selector 1540 may include a multiplexer that may obtain certain information from the register 1542, the counter 1544, and the random number generation circuit 1546 and selectively output the information and a demultiplexer that obtains an intermediate operation result of the learning circuit 1530 and outputs the intermediate operation result such that the result is stored in the register 1542.

According to an embodiment of the disclosure, the learning circuit 1530 may perform a learning process based on a first edge sequence or a second edge sequence, and perform an inference process based on a learning result. The learning circuit 1530 may store an intermediate operation result of a learning process at a second operational cycle in the register 1542 through the selector 1540, and according to an embodiment of the disclosure, the counter 1544 may determine whether overflow has occurred based on a value of the intermediate operation result, and may calculate a number of times that overflow has occurred based on a result of the determination. The encoding apparatus 1500 may control a deep neural network to perform inference and learning by using a dynamic fixed point method in which a fixed point may be dynamically changed based on the number of times of overflow of the second operational cycle calculated by the counter 1544. That is, when performing an inference and learning process by using the deep neural network of the learning circuit 1530, in order to efficiently control input and output information while preventing overflow in the register 1542, an intermediate operation result may be stored in the register 1542, and the counter 1544 may count a number of times of overflow.

According to an embodiment of the disclosure, the learning circuit 1530 may compare the number of times of overflow calculated by the counter 1544 with a threshold number of times of overflow to determine whether to perform a learning and inference process by using a dynamic fixed point method. That is, the learning circuit 1530 may determine whether to perform a learning and inference process by using a dynamic fixed point method based on a result of comparing the number of times of overflow calculated by using the counter 1544 with the threshold number of times of overflow, by using a comparator. For example, when the number of times of overflow calculated by using the counter 1544 is equal to or higher than the threshold number of times of overflow, the learning circuit 1530 may perform a learning or inference process in a certain layer by changing a fixed point by using a dynamic fixed point method.

According to an embodiment of the disclosure, the encoding apparatus 1500 connected to the selector 1540 may selectively use at least one of an operation of determining a second edge sequence based on a result of comparing a first edge weight stored in the register 1542 with a preset threshold weight, an operation of determining a second edge sequence based on a result of comparing a first edge sequence stored in the memory 1510 with a random number sequence obtained by using the random number generation circuit 1546, or a learning process performed using the counter 1544 calculating a number of times of overflow of an intermediate calculation result stored in the register 1542.

As described above, according to the method of performing learning of a deep neural network according to the embodiments of the disclosure and the apparatus performing the method, an edge sequence to be used in a subsequent operational cycle may be obtained quickly and easily based on edge sequence information that has been used in a previous operational cycle and is stored in a hardware apparatus itself. In addition, by generating an edge sequence to be used in a subsequent operational cycle based on edge sequence information used at a previous operational cycle and a random number sequence obtained at a current operational cycle, an execution rate of operation via a deep neural network may be increased, and a hardware apparatus performing a dropout operation via the deep neural network may be easily implemented.

In addition, an edge sequence may be obtained without an additional software module for obtaining an edge sequence, and thus, a memory size of a hardware apparatus performing operation via a deep neural network may be reduced, and accordingly, the hardware apparatus itself may be reduced in size.

While the disclosure has been particularly shown and described with reference to embodiments thereof, it will be understood by those of ordinary skill in the art that various changes in form and details may be made therein without departing from the spirit and scope of the disclosure as defined by the appended claims. Therefore, the embodiments of the disclosure should be considered in a descriptive sense only and not for purposes of limitation. The scope of the disclosure is defined not by the detailed description of the disclosure but by the appended claims, and all differences within the scope will be construed as being included in the disclosure.

The embodiments of the disclosure can be written as computer programs and can be implemented in general-use digital computers that execute the programs using a computer readable recording medium. Examples of the computer readable recording medium include storage media such as magnetic storage media (e.g., ROM, floppy disks, hard disks, etc.) and optical recording media (e.g., CD-ROMs, or DVDs).

According to the method of performing learning of a deep neural network and the apparatus performing the method of the disclosure, the amount of operations may be reduced and a standby time may be minimized, thereby quickly performing learning via the deep neural network.

In detail, according to the method of performing learning of a deep neural network and the apparatus performing the method of the disclosure, connection or disconnection of edges or nodes constituting a layer forming a deep neural network may be quickly controlled.

In detail, according to the method of performing learning of a deep neural network and the apparatus performing the method of the disclosure, instead of software implementation, a hardware component is used in performing a dropout operation used to solve the problem of overfitting occurring in learning through a deep neural network, thereby minimizing the amount of operations and increasing an operation rate.

It should be understood that embodiments of the disclosure described herein should be considered in a descriptive sense only and not for purposes of limitation. Descriptions of features or aspects within each embodiment of the disclosure should typically be considered as available for other similar features or aspects in other embodiments of the disclosure.

While one or more embodiments of the disclosure have been described with reference to the figures, it will be understood by those of ordinary skill in the art that various changes in form and details may be made therein without departing from the spirit and scope as defined by the following claims.

What is claimed is:

1. An encoding apparatus comprising:
a memory storing a random number sequence generated by a random number generator; and
at least one processor configured to:
receive dropout information of a deep neural network, the dropout information indicating a ratio between connected edges and disconnected edges of a plurality of first edges included in a first layer of the deep neural network,
generate an edge sequence indicating connection or disconnection of a plurality of second edges included in a second layer of the deep neural network by modifying the random number sequence based on a comparison between the dropout information and a target ratio value, and
output the edge sequence such that the connection or the disconnection of the plurality of second edges included in the second layer of the deep neural network are reconfigured,
wherein the at least one processor is further configured to modify the random number sequence such that a ratio value of a number of bits having a value of 0 and 1 in an entirety of the deep neural network is the target ratio value.

2. The encoding apparatus of claim 1, wherein the random number sequence is based on a clock signal of the random number generator.

3. The encoding apparatus of claim 2, wherein a size of the random number sequence is based on a number of the plurality of second edges in the second layer of the deep neural network.

4. The encoding apparatus of claim 3, wherein the size of the random number sequence is equal to a quantity of edges in the first layer of the deep neural network.

5. The encoding apparatus of claim 2, wherein the dropout information, the random number sequence, and the edge sequence have a bit width formed of binary numbers.

6. The encoding apparatus of claim 5, wherein the at least one processor is further configured to generate the edge sequence based on a pattern of bits in the random number sequence having a bit value of 0 and bits in the random number sequence having a bit value of 1, and a pattern of bits in the dropout information having a bit value indicating a connected edge and bits in the dropout information having a bit value indicating a disconnected edge.

7. The encoding apparatus of claim 2, wherein the edge sequence is a basis for a dropout operation in the first layer of the deep neural network.

8. The encoding apparatus of claim 2, wherein the at least one processor is further configured to obtain weights of the plurality of second edges in the second layer of the deep neural network, perform a pruning operation based on a result of comparing the weights with a preset threshold weight, and generate the edge sequence to indicate the connection or the disconnection of the plurality of second edges of the second layer of the deep neural network based on the pruning operation.

9. The encoding apparatus of claim 1, wherein the at least one processor is further configured to:
select one of a plurality of types of input signals and output the selected signal;
receive an operation result from the deep neural network to determine whether overflow has occurred in the operation result; and
perform a dynamic fixed point operation of modifying an expressible range of information used in the deep neural network based on whether overflow has occurred.

10. The encoding apparatus of claim 1, further comprising a learning circuit including the deep neural network,
wherein the learning circuit is configured to:
receive the edge sequence,
change a connection state of at least one second edge included in the second layer of the deep neural network based on the edge sequence, and
perform a learning operation using the first layer.

11. The encoding apparatus of claim 1, wherein the at least one processor is further configured to:
generate a corrected random number sequence by correcting at least one random number value included in the random number sequence based on the comparison between the dropout information and the target ratio value, and use the corrected random number sequence as the edge sequence.

12. An encoding method of an encoding apparatus, the encoding method comprising:

storing a random number sequence generated by a random number generator;

receiving dropout information of a deep neural network, the dropout information indicating a ratio between connected edges and disconnected edges of a plurality of first edges included in a first layer of the deep neural network;

generating an edge sequence indicating connection or disconnection of a plurality of second edges included in a second layer of the deep neural network by modifying the random number sequence based on a comparison between the dropout information and a target ratio value; and outputting the edge sequence such that the connection or the disconnection of the plurality of second edges included in the second layer of the deep neural network are reconfigured, wherein the generating of the edge sequence comprises modifying the random number sequence such that a ratio value of a number of bits having a value of 0 and 1 in an entirely of the deep neural network is the target ratio value.

13. The encoding method of claim 12, wherein the random number sequence is based on a clock signal of the random number generator.

14. The encoding method of claim 13, wherein a size of the random number sequence is based on a number of the plurality of second edges in the second layer of the deep neural network.

15. The encoding method of claim 14, wherein the size of the random number sequence is equal to a quantity of edges in the first layer of the deep neural network.

16. The encoding method of claim 13, wherein the dropout information, the random number sequence, and the edge sequence have a bit width formed of binary numbers.

17. The encoding method of claim 16, wherein the generating of the edge sequence comprises generating the edge sequence based on a pattern of bits in the random number sequence having a bit value of 0 and bits in the random number sequence having a bit value of 1, and a pattern of bits in the dropout information having a bit value indicating a connected edge and bits in the dropout information having a bit value indicating a disconnected edge.

18. The encoding method of claim 13, wherein the edge sequence is a basis for a dropout operation in the first layer of the deep neural network.

19. The encoding method of claim 13, further comprising:

obtaining weights of the plurality of second edges of the second layer of the deep neural network;

performing a pruning operation based on a result of comparing the weights of the plurality of second edges with a preset threshold weight; and generating the edge sequence to indicate the connection or the disconnection of the plurality of second edges of the second layer of the deep neural network based on the pruning operation.

20. The encoding method of claim 12, further comprising:

receiving an operation result from the deep neural network;

determining whether overflow has occurred in the operation result; and performing a dynamic fixed point operation of modifying an expressible range of a value used in the deep neural network based on whether overflow has occurred.

* * * * *